(12) United States Patent
Mao et al.

(10) Patent No.: US 10,921,764 B2
(45) Date of Patent: Feb. 16, 2021

(54) NEUROMUSCULAR CONTROL OF PHYSICAL OBJECTS IN AN ENVIRONMENT

(71) Applicant: Facebook Technologies, LLC, Menlo Park, CA (US)

(72) Inventors: Qiushi Mao, Brooklyn, NY (US); Jasmine Stone, Austin, TX (US); Adam Berenzweig, Brooklyn, NY (US); Patrick Kaifosh, New York, NY (US); Robert John DiMaiolo, New York, NY (US); Jason Reisman, Brooklyn, NY (US); Robert Cochran, New York, NY (US); Naor Brown, New York, NY (US); Nitzan Bartov, New York, NY (US); Joshua Duyan, New York, NY (US); Daniel Wetmore, Brooklyn, NY (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/584,484

(22) Filed: Sep. 26, 2019

(65) Prior Publication Data
US 2020/0097083 A1   Mar. 26, 2020

Related U.S. Application Data

(60) Provisional application No. 62/866,505, filed on Jun. 25, 2019, provisional application No. 62/736,929, filed on Sep. 26, 2018.

(51) Int. Cl.
*G06F 3/01* (2006.01)
*G05B 15/02* (2006.01)
(Continued)

(52) U.S. Cl.
CPC .......... *G05B 15/02* (2013.01); *G05B 13/027* (2013.01); *G06F 3/017* (2013.01);
(Continued)

(58) Field of Classification Search
CPC . G06F 3/015; G06F 3/16; G06F 3/017; G06F 3/04842; G06T 19/006;
(Continued)

(56) References Cited

U.S. PATENT DOCUMENTS 4,055,168 A   10/1977 Miller et al.
4,896,120 A   1/1990 Kamil
(Continued)

FOREIGN PATENT DOCUMENTS

CA   2902045 A1   8/2014
CA   2921954 A1   2/2015
(Continued)

OTHER PUBLICATIONS

Extended European Search Report for European Application No. EP 17835111.0 dated Nov. 21, 2019.
(Continued)

*Primary Examiner* — Chun Cao
(74) *Attorney, Agent, or Firm* — FisherBroyles, LLP

(57) ABSTRACT

Methods and apparatus for controlling a physical object in an environment based, at least in part, on neuromuscular signals. The method comprises recording a plurality of neuromuscular signals from a plurality of neuromuscular sensors arranged on one or more wearable devices worn by a user, receiving a selection of a physical object within the environment, and controlling, based at least in part on the plurality of neuromuscular signals and/or information based on the plurality of neuromuscular signals, an operation of the selected object within the environment.

30 Claims, 14 Drawing Sheets

(51) Int. Cl.
  *G06F 3/0484*   (2013.01)
  *G06T 19/00*   (2011.01)
  *G06F 3/16*   (2006.01)
  *G05B 13/02*   (2006.01)

(52) U.S. Cl.
  CPC ............ *G06F 3/04842* (2013.01); *G06F 3/16* (2013.01); *G06T 19/006* (2013.01)

(58) Field of Classification Search
  CPC .... G05B 15/02; G05B 13/027; A61B 5/0488; A61B 5/4528
  USPC ........................................................ 700/48
  See application file for complete search history.

(56) References Cited

U.S. PATENT DOCUMENTS

| | | |
|---|---|---|
| 5,625,577 A | 4/1997 | Kunii et al. |
| 6,005,548 A | 12/1999 | Latypov et al. |
| 6,009,210 A | 12/1999 | Kand |
| 6,244,873 B1 | 6/2001 | Hill et al. |
| 6,411,843 B1 | 6/2002 | Zarychta |
| 6,658,287 B1 | 12/2003 | Litt et al. |
| 6,720,984 B1 | 4/2004 | Jorgensen et al. |
| 6,774,885 B1 | 8/2004 | Even-Zohar |
| 6,942,621 B2 | 9/2005 | Avinash et al. |
| 7,089,148 B1 | 8/2006 | Bachmann et al. |
| 7,351,975 B2 | 4/2008 | Brady et al. |
| 7,574,253 B2 | 8/2009 | Edney et al. |
| 7,580,742 B2 | 8/2009 | Tan et al. |
| 7,787,946 B2 | 8/2010 | Stahmann et al. |
| 7,805,386 B2 | 9/2010 | Greer |
| 7,901,368 B2 | 3/2011 | Flaherty et al. |
| 8,170,656 B2 | 5/2012 | Tan et al. |
| 8,190,249 B1 | 5/2012 | Gharieb et al. |
| 8,311,623 B2 | 11/2012 | Sanger |
| 8,351,651 B2 | 1/2013 | Lee |
| 8,421,634 B2 | 4/2013 | Tan et al. |
| 8,435,191 B2 | 5/2013 | Barboutis et al. |
| 8,437,844 B2 | 5/2013 | Syed Momen et al. |
| 8,447,704 B2 | 5/2013 | Tan et al. |
| 8,484,022 B1 | 7/2013 | Vanhoucke |
| 8,718,980 B2 | 5/2014 | Garudadri et al. |
| 8,744,543 B2 | 6/2014 | Li et al. |
| 8,754,862 B2 | 6/2014 | Zaliva |
| D717,685 S | 11/2014 | Bailey et al. |
| 8,880,163 B2 | 11/2014 | Barachant et al. |
| 8,890,875 B2 | 11/2014 | Jammes et al. |
| 8,892,479 B2 | 11/2014 | Tan et al. |
| 9,037,530 B2 | 5/2015 | Tan et al. |
| D742,272 S | 11/2015 | Bailey et al. |
| 9,218,574 B2 | 12/2015 | Phillipps et al. |
| 9,235,934 B2 | 1/2016 | Mandella et al. |
| 9,240,069 B1 | 1/2016 | Li |
| 9,278,453 B2 | 3/2016 | Assad |
| 9,299,248 B2 | 3/2016 | Lake et al. |
| D756,359 S | 5/2016 | Bailey et al. |
| 9,349,218 B2 | 5/2016 | Keating et al. |
| 9,351,653 B1 | 5/2016 | Harrison |
| 9,367,139 B2 | 6/2016 | Ataee et al. |
| 9,372,535 B2 | 6/2016 | Bailey et al. |
| 9,389,694 B2 | 7/2016 | Ataee et al. |
| 9,408,316 B2 | 8/2016 | Bailey et al. |
| 9,459,697 B2 | 10/2016 | Bedikian et al. |
| 9,483,123 B2 | 11/2016 | Aleem et al. |
| 9,597,015 B2 | 3/2017 | McNames et al. |
| 9,600,030 B2 | 3/2017 | Bailey et al. |
| 9,612,661 B2 | 4/2017 | Wagner et al. |
| 9,613,262 B2 | 4/2017 | Holz |
| 9,654,477 B1 | 5/2017 | Kotamraju |
| 9,659,403 B1 | 5/2017 | Horowitz |
| 9,687,168 B2 | 6/2017 | John |
| 9,696,795 B2 | 7/2017 | Marcolina et al. |
| 9,720,515 B2 | 8/2017 | Wagner et al. |
| 9,741,169 B1 | 8/2017 | Holz |
| 9,766,709 B2 | 9/2017 | Holz |
| 9,785,247 B1 | 10/2017 | Horowitz et al. |
| 9,788,789 B2 | 10/2017 | Bailey |
| 9,864,431 B2 | 1/2018 | Keskin et al. |
| 9,867,548 B2 | 1/2018 | Le et al. |
| 9,880,632 B2 | 1/2018 | Ataee et al. |
| 9,891,718 B2 | 2/2018 | Connor |
| 10,042,422 B2 | 8/2018 | Morun et al. |
| 10,070,799 B2 | 9/2018 | Ang et al. |
| 10,078,435 B2 | 9/2018 | Noel |
| 10,101,809 B2 | 10/2018 | Morun et al. |
| 10,152,082 B2 | 12/2018 | Bailey |
| 10,188,309 B2 | 1/2019 | Morun et al. |
| 10,199,008 B2 | 2/2019 | Aleem et al. |
| 10,203,751 B2 | 2/2019 | Keskin et al. |
| 10,216,274 B2 | 2/2019 | Chapeskie et al. |
| 10,251,577 B2 | 4/2019 | Morun et al. |
| 10,310,601 B2 | 6/2019 | Morun et al. |
| 10,331,210 B2 | 6/2019 | Morun et al. |
| 10,362,958 B2 | 7/2019 | Morun et al. |
| 10,409,371 B2 | 9/2019 | Kaifosh et al. |
| 10,437,335 B2 * | 10/2019 | Daniels ............... G06F 3/015 |
| 10,460,455 B2 | 10/2019 | Giurgica-Tiron et al. |
| 10,489,986 B2 * | 11/2019 | Kaifosh ............... G06F 3/015 |
| 10,496,168 B2 | 12/2019 | Kaifosh et al. |
| 10,504,286 B2 | 12/2019 | Kaifosh et al. |
| 2003/0144829 A1 | 7/2003 | Geatz et al. |
| 2003/0171921 A1 | 9/2003 | Manabe et al. |
| 2003/0184544 A1 | 10/2003 | Prudent |
| 2004/0054273 A1 | 3/2004 | Finneran et al. |
| 2004/0092839 A1 | 5/2004 | Shin et al. |
| 2006/0129057 A1 | 6/2006 | Maekawa et al. |
| 2007/0009151 A1 | 1/2007 | Pittman et al. |
| 2007/0172797 A1 | 7/2007 | Hada et al. |
| 2007/0177770 A1 | 8/2007 | Derchak et al. |
| 2007/0256494 A1 | 11/2007 | Nakamura et al. |
| 2007/0285399 A1 | 12/2007 | Lund |
| 2008/0051673 A1 | 2/2008 | Kong et al. |
| 2008/0052643 A1 | 2/2008 | Ike et al. |
| 2008/0103639 A1 * | 5/2008 | Troy ................... G05D 1/0027 701/2 |
| 2008/0214360 A1 | 9/2008 | Stirling et al. |
| 2008/0221487 A1 | 9/2008 | Zohar et al. |
| 2009/0027337 A1 | 1/2009 | Hildreth |
| 2009/0079813 A1 | 3/2009 | Hildreth |
| 2009/0082692 A1 * | 3/2009 | Hale ................... A61B 5/0476 600/544 |
| 2009/0082701 A1 | 3/2009 | Zohar et al. |
| 2009/0112080 A1 | 4/2009 | Matthews |
| 2009/0124881 A1 | 5/2009 | Rytky |
| 2009/0326406 A1 | 12/2009 | Tan et al. |
| 2009/0327171 A1 | 12/2009 | Tan et al. |
| 2010/0030532 A1 | 2/2010 | Arora et al. |
| 2010/0063794 A1 | 3/2010 | Hernandez-Rebollar |
| 2010/0106044 A1 | 4/2010 | Linderman |
| 2010/0113910 A1 | 5/2010 | Brauers et al. |
| 2010/0280628 A1 | 11/2010 | Sankai |
| 2010/0292595 A1 | 11/2010 | Paul |
| 2010/0292606 A1 | 11/2010 | Prakash et al. |
| 2010/0292617 A1 | 11/2010 | Lei et al. |
| 2010/0293115 A1 | 11/2010 | Seyed Momen |
| 2010/0315266 A1 | 12/2010 | Gunawardana et al. |
| 2011/0077484 A1 | 3/2011 | Van Slyke et al. |
| 2011/0092826 A1 | 4/2011 | Lee et al. |
| 2011/0173204 A1 | 7/2011 | Murillo et al. |
| 2011/0173574 A1 | 7/2011 | Clavin et al. |
| 2011/0230782 A1 | 9/2011 | Bartol et al. |
| 2012/0066163 A1 | 3/2012 | Balls et al. |
| 2012/0188158 A1 | 7/2012 | Tan et al. |
| 2012/0265480 A1 | 10/2012 | Oshima |
| 2012/0283526 A1 | 11/2012 | Gommesen et al. |
| 2013/0004033 A1 | 1/2013 | Trugenberger |
| 2013/0077820 A1 | 3/2013 | Marais et al. |
| 2013/0123656 A1 | 5/2013 | Heck |
| 2013/0141375 A1 | 6/2013 | Ludwig et al. |
| 2013/0207889 A1 | 8/2013 | Chang et al. |
| 2013/0217998 A1 | 8/2013 | Mahfouz et al. |
| 2013/0232095 A1 | 9/2013 | Tan et al. |
| 2013/0317382 A1 | 11/2013 | Le |

(56) References Cited

U.S. PATENT DOCUMENTS

| | | |
|---|---|---|
| 2013/0317648 A1 | 11/2013 | Assad |
| 2014/0052150 A1 | 2/2014 | Taylor et al. |
| 2014/0092009 A1 | 4/2014 | Yen et al. |
| 2014/0098018 A1 | 4/2014 | Kim et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0223462 A1 | 8/2014 | Aimone et al. |
| 2014/0240103 A1 | 8/2014 | Lake et al. |
| 2014/0240223 A1 | 8/2014 | Lake et al. |
| 2014/0245200 A1 | 8/2014 | Holz |
| 2014/0249397 A1 | 9/2014 | Lake et al. |
| 2014/0277622 A1 | 9/2014 | Raniere |
| 2014/0278441 A1 | 9/2014 | Ton et al. |
| 2014/0297528 A1 | 10/2014 | Agrawal et al. |
| 2014/0304665 A1 | 10/2014 | Holz |
| 2014/0330404 A1 | 11/2014 | Abdelghani et al. |
| 2014/0334083 A1 | 11/2014 | Bailey |
| 2014/0344731 A1 | 11/2014 | Holz |
| 2014/0355825 A1 | 12/2014 | Kim et al. |
| 2014/0358024 A1 | 12/2014 | Nelson et al. |
| 2014/0361988 A1 | 12/2014 | Katz et al. |
| 2014/0364703 A1 | 12/2014 | Kim et al. |
| 2014/0365163 A1 | 12/2014 | Jallon |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0025355 A1 | 1/2015 | Bailey et al. |
| 2015/0029092 A1 | 1/2015 | Holz et al. |
| 2015/0035827 A1 | 2/2015 | Yamaoka et al. |
| 2015/0045689 A1 | 2/2015 | Barone |
| 2015/0045699 A1 | 2/2015 | Mokaya et al. |
| 2015/0051470 A1 | 2/2015 | Bailey et al. |
| 2015/0057770 A1 | 2/2015 | Bailey et al. |
| 2015/0070270 A1 | 3/2015 | Bailey et al. |
| 2015/0070274 A1 | 3/2015 | Morozov |
| 2015/0084860 A1 | 3/2015 | Aleem et al. |
| 2015/0109202 A1 | 4/2015 | Ataee et al. |
| 2015/0124566 A1 | 5/2015 | Lake et al. |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0157944 A1 | 6/2015 | Gottlieb |
| 2015/0169074 A1 | 6/2015 | Ataee et al. |
| 2015/0182165 A1 | 7/2015 | Miller et al. |
| 2015/0193949 A1 | 7/2015 | Katz et al. |
| 2015/0223716 A1 | 8/2015 | Korkala et al. |
| 2015/0234426 A1 | 8/2015 | Bailey et al. |
| 2015/0261306 A1 | 9/2015 | Lake |
| 2015/0261318 A1 | 9/2015 | Scavezze et al. |
| 2015/0277575 A1 | 10/2015 | Ataee et al. |
| 2015/0296553 A1 | 10/2015 | DiFranco et al. |
| 2015/0302168 A1 | 10/2015 | De Sapio et al. |
| 2015/0309563 A1 | 10/2015 | Connor |
| 2015/0309582 A1 | 10/2015 | Gupta |
| 2015/0313496 A1 | 11/2015 | Connor |
| 2015/0325202 A1 | 11/2015 | Lake et al. |
| 2015/0332013 A1 | 11/2015 | Lee et al. |
| 2015/0346701 A1 | 12/2015 | Gordon et al. |
| 2015/0366504 A1 | 12/2015 | Connor |
| 2015/0370326 A1 | 12/2015 | Chapeskie et al. |
| 2015/0370333 A1 | 12/2015 | Ataee et al. |
| 2016/0011668 A1 | 1/2016 | Gilad-Bachrach et al. |
| 2016/0049073 A1 | 2/2016 | Lee |
| 2016/0092504 A1 | 3/2016 | Mitri et al. |
| 2016/0144172 A1 | 5/2016 | Hsueh et al. |
| 2016/0162604 A1 | 6/2016 | Xioli et al. |
| 2016/0187992 A1 | 6/2016 | Yamamoto et al. |
| 2016/0235323 A1 | 8/2016 | Tadi et al. |
| 2016/0239080 A1 | 8/2016 | Marcolina et al. |
| 2016/0262687 A1 | 9/2016 | Imperial |
| 2016/0274758 A1 | 9/2016 | Bailey |
| 2016/0275726 A1 | 9/2016 | Mullins |
| 2016/0292497 A1 | 10/2016 | Kehtarnavaz et al. |
| 2016/0313798 A1 | 10/2016 | Connor |
| 2016/0313801 A1 | 10/2016 | Wagner et al. |
| 2016/0313890 A1 | 10/2016 | Walline et al. |
| 2016/0313899 A1 | 10/2016 | Noel |
| 2016/0350973 A1 | 12/2016 | Shapira et al. |
| 2017/0031502 A1 | 2/2017 | Rosenberg et al. |
| 2017/0035313 A1 | 2/2017 | Hong et al. |
| 2017/0061817 A1 | 3/2017 | Mettler May |
| 2017/0068445 A1 | 3/2017 | Lee et al. |
| 2017/0080346 A1 | 3/2017 | Abbas |
| 2017/0090604 A1 | 3/2017 | Barbier |
| 2017/0091567 A1 | 3/2017 | Wang et al. |
| 2017/0119472 A1 | 5/2017 | Herrmann et al. |
| 2017/0123487 A1 | 5/2017 | Hazra et al. |
| 2017/0124816 A1 | 5/2017 | Yang et al. |
| 2017/0161635 A1 | 6/2017 | Oono et al. |
| 2017/0188980 A1 | 7/2017 | Ash |
| 2017/0259167 A1 | 9/2017 | Cook et al. |
| 2017/0285756 A1 | 10/2017 | Wang et al. |
| 2017/0285848 A1 | 10/2017 | Rosenberg et al. |
| 2017/0296363 A1 | 10/2017 | Yetkin et al. |
| 2017/0301630 A1 | 10/2017 | Nguyen et al. |
| 2017/0308118 A1 | 10/2017 | Ito |
| 2017/0344706 A1 | 11/2017 | Tones et al. |
| 2017/0347908 A1 | 12/2017 | Watanabe et al. |
| 2018/0000367 A1 | 1/2018 | Longinotti-Buitoni |
| 2018/0020951 A1 | 1/2018 | Kaifosh et al. |
| 2018/0020978 A1 | 1/2018 | Kaifosh et al. |
| 2018/0024634 A1 | 1/2018 | Kaifosh et al. |
| 2018/0024635 A1 | 1/2018 | Kaifosh et al. |
| 2018/0064363 A1 | 3/2018 | Morun et al. |
| 2018/0067553 A1 | 3/2018 | Morun et al. |
| 2018/0081439 A1 | 3/2018 | Daniels |
| 2018/0088765 A1 | 3/2018 | Bailey |
| 2018/0092599 A1 | 4/2018 | Kerth et al. |
| 2018/0095630 A1 | 4/2018 | Bailey |
| 2018/0101235 A1 | 4/2018 | Bodensteiner et al. |
| 2018/0101289 A1 | 4/2018 | Bailey |
| 2018/0120948 A1 | 5/2018 | Aleem et al. |
| 2018/0140441 A1 | 5/2018 | Poirters |
| 2018/0150033 A1 | 5/2018 | Lake et al. |
| 2018/0153430 A1 | 6/2018 | Ang et al. |
| 2018/0153444 A1 | 6/2018 | Yang et al. |
| 2018/0154140 A1 | 6/2018 | Bouton et al. |
| 2018/0178008 A1 | 6/2018 | Bouton et al. |
| 2018/0301057 A1 | 10/2018 | Hargrove et al. |
| 2018/0307314 A1 | 10/2018 | Connor |
| 2018/0321745 A1 | 11/2018 | Morun et al. |
| 2018/0321746 A1 | 11/2018 | Morun et al. |
| 2018/0333575 A1 | 11/2018 | Bouton |
| 2018/0344195 A1 | 12/2018 | Morun et al. |
| 2018/0360379 A1 | 12/2018 | Harrison et al. |
| 2019/0008453 A1 | 1/2019 | Spoof |
| 2019/0025919 A1* | 1/2019 | Tadi .................. G06F 3/015 |
| 2019/0033967 A1 | 1/2019 | Morun et al. |
| 2019/0033974 A1 | 1/2019 | Mu et al. |
| 2019/0038166 A1* | 2/2019 | Tavabi ................ A61B 5/0478 |
| 2019/0076716 A1 | 3/2019 | Chiou et al. |
| 2019/0121305 A1 | 4/2019 | Kaifosh et al. |
| 2019/0121306 A1 | 4/2019 | Kaifosh et al. |
| 2019/0146809 A1 | 5/2019 | Lee et al. |
| 2019/0150777 A1 | 5/2019 | Guo et al. |
| 2019/0192037 A1 | 6/2019 | Morun et al. |
| 2019/0212817 A1 | 7/2019 | Kaifosh et al. |
| 2019/0223748 A1 | 7/2019 | Al-natsheh et al. |
| 2019/0227627 A1 | 7/2019 | Kaifosh et al. |
| 2019/0228330 A1 | 7/2019 | Kaifosh et al. |
| 2019/0228533 A1 | 7/2019 | Giurgica-Tiron et al. |
| 2019/0228579 A1 | 7/2019 | Kaifosh et al. |
| 2019/0228590 A1 | 7/2019 | Kaifosh et al. |
| 2019/0228591 A1 | 7/2019 | Giurgica-Tiron et al. |
| 2019/0247650 A1 | 8/2019 | Tran |
| 2019/0324549 A1* | 10/2019 | Araki .................. G06F 3/0481 |
| 2019/0357787 A1* | 11/2019 | Barachant ............ G06F 3/015 |
| 2019/0362557 A1* | 11/2019 | Lacey .................. G06T 19/006 |

FOREIGN PATENT DOCUMENTS

| | | |
|---|---|---|
| CA | 2939644 A1 | 8/2015 |
| CN | 1838933 A | 9/2006 |

(56) References Cited

FOREIGN PATENT DOCUMENTS

| | | |
|---|---|---|
| CN | 103777752 A | 5/2014 |
| CN | 105190578 A | 12/2015 |
| CN | 106102504 A | 11/2016 |
| EP | 2198521 B1 | 6/2012 |
| EP | 2959394 A1 | 12/2015 |
| EP | 3104737 A1 | 12/2016 |
| JP | H05-277080 A | 10/1993 |
| JP | 2005-095561 A | 4/2005 |
| JP | 2010-520561 A | 6/2010 |
| JP | 2016-507851 A | 3/2016 |
| JP | 2017-509386 A | 4/2017 |
| JP | 2018-026066 A | 2/2018 |
| KR | 10-2011-0034863 A | 4/2011 |
| KR | 2015-0123254 A | 11/2015 |
| KR | 10-2016-0118164 A | 10/2016 |
| KR | 2016-0121552 A | 10/2016 |
| KR | 10-1790147 B1 | 10/2017 |
| WO | WO 2008/109248 A2 | 9/2008 |
| WO | WO 2009/042313 A1 | 4/2009 |
| WO | WO 2010/104879 A2 | 9/2010 |
| WO | WO 2012/155157 A1 | 11/2012 |
| WO | WO 2014/130871 A1 | 8/2014 |
| WO | WO 2014/186370 A1 | 11/2014 |
| WO | WO 2014/194257 A1 | 12/2014 |
| WO | WO 2014/197443 A1 | 12/2014 |
| WO | WO 2015/027089 A1 | 2/2015 |
| WO | WO 2015/073713 A1 | 5/2015 |
| WO | WO 2015/081113 A1 | 6/2015 |
| WO | WO 2015/123445 A1 | 8/2015 |
| WO | WO 2015/199747 A1 | 12/2015 |
| WO | WO 2016/041088 A1 | 3/2016 |
| WO | WO 2017/062544 A1 | 4/2017 |
| WO | WO 2017/092225 A1 | 6/2017 |
| WO | WO 2017/120669 A1 | 7/2017 |
| WO | WO 2017/172185 A1 | 10/2017 |
| WO | WO 2017/208167 A1 | 12/2017 |
| WO | 2020/069181 A1 | 4/2020 |

OTHER PUBLICATIONS

Extended European Search Report for European Application No. EP 17835140.9 dated Nov. 26, 2019.
International Search Report and Written Opinion for International Application No. PCT/US2017/043686 dated Oct. 6, 2017.
International Preliminary Report on Patentability for International Application No. PCT/US2017/043686 dated Feb. 7, 2019.
International Search Report and Written Opinion for International Application No. PCT/US2017/043693 dated Oct. 6, 2017.
International Preliminary Report on Patentability for International Application No. PCT/US2017/043693 dated Feb. 7, 2019.
International Search Report and Written Opinion for International Application No. PCT/US2017/043791 dated Oct. 5, 2017.
International Preliminary Report on Patentability for International Application No. PCT/US2017/043791 dated Feb. 7, 2019.
International Search Report and Written Opinion for International Application No. PCT/US2017/043792 dated Oct. 5, 2017.
International Preliminary Report on Patentability for International Application No. PCT/US2017/043792 dated Feb. 7, 2019.
International Search Report and Written Opinion for International Application No. PCT/US2018/056768 dated Jan. 15, 2019.
International Search Report and Written Opinion for International Application No. PCT/US2018/061409 dated Mar. 12, 2019.
International Search Report and Written Opinion for International Application No. PCT/US2018/063215 dated Mar. 21, 2019.
International Search Report and Written Opinion for International Application No. PCT/US2019/015134 dated May 15, 2019.
International Search Report and Written Opinion for International Application No. PCT/US2019/015167 dated May 21, 2019.
International Search Report and Written Opinion for International Application No. PCT/US2019/015174 dated May 21, 2019.
International Search Report and Written Opinion for International Application No. PCT/US2019/015238 dated May 16, 2019.
International Search Report and Written Opinion for International Application No. PCT/US2019/015183 dated May 3, 2019.
International Search Report and Written Opinion for International Application No. PCT/US2019/015180 dated May 28, 2019.
International Search Report and Written Opinion for International Application No. PCT/US2019/015244 dated May 16, 2019.
International Search Report and Written Opinion for International Application No. PCT/US19/20065 dated May 16, 2019.
Invitation to Pay Additional Fees for International Application No. PCT/US2019/031114 dated Aug. 6, 2019.
International Search Report and Written Opinion for International Application No. PCT/US2019/028299 dated Aug. 9, 2019.
International Search Report and Written Opinion for International Application No. PCT/US2019/034173 dated Sep. 18, 2019.
International Search Report and Written Opinion for International Application No. PCT/US2019/037302 dated Oct. 11, 2019.
Invitation to Pay Additional Fees for International Application No. PCT/US2019/049094 dated Oct. 24, 2019.
International Search Report and Written Opinion for International Application No. PCT/US2019/042579 dated Oct. 31, 2019.
International Search Report and Written Opinion for International Application No. PCT/US2019/046351 dated Nov. 7, 2019.
International Search Report and Written Opinion for International Application No. PCT/US2019/052131 dated Dec. 6, 2019.
Al-Mashhadany, Inverse Kinematics Problem (IKP) of 6-DOF Manipulator Bgy Locally Recurrent Neural Networks (LRNNs). Management and Service Science (MASS). 2010 International Conference on, IEEE. Aug. 24, 2010. 5 pages. ISBN: 978-1-4244-5325-2.
Arkenbout et al., Robust Hand Motion Tracking through Data Fusion of 5DT Data Glove and Nimble VR Kinect Camera Measurements. Sensors. 2015;15:31644-71.
Benko et al., Enhancing Input on and Above the Interactive Surface with Muscle Sensing. The ACM International Conference on Interactive Tabletops and Surfaces. Its '09. 2009:93-100.
Boyali et al., Spectral Collaborative Representation based Classification for hand gestures recognition on electromyography signals. Biomedical Signal Processing and Control. 2016;24:11-18.
Cheng et al., A Novel Phonology- and Radical-Coded Chinese Sign Language Recognition Framework Using Accelerometer and Surface Electromyography Sensors. Sensors. 2015;15:23303-24.
Csapo et al., Evaluation of Human-Myo Gesture Control Capabilities in Continuous Search and Select Operations. 7th IEEE International Conference on Cognitive Infocommunications. 2016;000415-20.
Davoodi et al., Development of a Physics-Based Target Shooting Game to Train Amputee Users of Multijoint Upper Limb Prostheses. Presence. Massachusetts Institute of Technology. 2012;21(1):85-95.
Delis et al., Development of a Myoelectric Controller Based on Knee Angle Estimation. Biodevices 2009. International Conference on Biomedical Electronics and Devices. Jan. 17, 2009. 7 pages.
Diener et al., Direct conversion from facial myoelectric signals to speech using Deep Neural Networks. 2015 International Joint Conference on Neural Networks (IJCNN). Oct. 1, 2015. 7 pages.
Ding et al., HMM with improved feature extraction-based feature parameters for identity recognition of gesture command operators by using a sensed Kinect-data stream. Neurocomputing. 2017;262:108-19.
Farina et al., Man/machine interface based on the discharge timings of spinal motor neurons after targeted muscle reinnervation. Nature. Biomedical Engineering. 2017;1:1-12.
Favorskaya et al., Localization and Recognition of Dynamic Hand Gestures Based on Hierarchy of Manifold Classifiers. International Archives of the Photogrammetry, Remote Sensing and Spatial Information Sciences. 2015;XL-5/W6:1-8.
Gallina et al., Surface EMG Biofeedback. Surface Electromyography: Physiology, Engineering, and Applications. 2016:485-500.
Gopura et al., A Human Forearm and wrist motion assist exoskeleton robot with EMG-based fuzzy-neuro control. Proceedings of the 2nd IEEE/RAS-EMBS International Conference on Biomedical Robotics and Biomechatronics. Oct. 19-22, 2008. 6 pages.

(56) References Cited

OTHER PUBLICATIONS

Hauschild et al., A Virtual Reality Environment for Designing and Fitting Neural Prosthetic Limbs. IEEE Transactions on Neural Systems and Rehabilitation Engineering. 2007;15(1):9-15.
Jiang, Purdue University Graduate School Thesis/Dissertation Acceptance. Graduate School Form 30. Updated Jan. 15, 2015. 24 pages.
Kawaguchi et al., Estimation of Finger Joint Angles Based on Electromechanical Sensing of Wrist Shape. IEEE Transactions on Neural Systems and Rehabilitation Engineering. 2017;25(9):1409-18.
Kim et al., Real-Time Human Pose Estimation and Gesture Recognition from Depth Images Using Superpixels and SVM Classifier. Sensors. 2015;15:12410-27.
Kipke et al., Silicon-substrate Intracortical Microelectrode Arrays for Long-Term Recording of Neuronal Spike Activity in Cerebral Cortex. IEEE Transactions on Neural Systems and Rehabilitation Engineering. 2003;11(2):151-155.
Koerner, Design and Characterization of the Exo-Skin Haptic Device: A Novel Tendon Actuated Textile Hand Exoskeleton. 2017. 5 pages.
Lee et al., Motion and Force Estimation System of Human Fingers. Journal of Institute of Control, Robotics and Systems. 2011;17(10):1014-1020.
Li et al., Motor Function Evaluation of Hemiplegic Upper-Extremities Using Data Fusion from Wearable Inertial and Surface EMG Sensors. Sensors. MDPI. 2017;17(582):1-17.
Lopes et al., Hand/arm gesture segmentation by motion using IMU and EMG sensing. ScienceDirect. Elsevier. Procedia Manufacturing. 2017;11:107-13.
Marcard et al., Sparse Inertial Poser: Automatic 3D Human Pose Estimation from Sparse IMUs. Eurographics. 2017;36(2). 12 pages.
Martin et al., A Novel Approach of Prosthetic Arm Control using Computer Vision, Biosignals, and Motion Capture. IEEE. 2014. 5 pages.
Mcintee, A Task Model of Free-Space Movement-Based Gestures. Dissertation. Graduate Faculty of North Carolina State University. Computer Science. 2016. 129 pages.
Mendes et al., Sensor Fusion and Smart Sensor in Sports and Biomedical Applications. Sensors. 2016;16(1569):1-31.
Mohamed, Homogeneous cognitive based biometrics for static authentication. Dissertation submitted to University of Victoria, Canada. 2010. 149 pages. URL:http://hdl.handle.net/1828/3211 [last accessed Oct. 11, 2019].
Naik et al., Source Separation and Identification issues in bio signals: A solution using Blind source separation. Intech. 2009. 23 pages.
Naik et al., Subtle Hand gesture identification for HCI using Temporal Decorrelation Source Separation BSS of surface EMG. Digital Image Computing Techniques and Applications. IEEE Computer Society. 2007;30-7.

Negro et al., Multi-channel intramuscular and surface EMG decomposition by convolutive blind source separation. Journal of Neural Engineering. 2016;13:1-17.
Saponas et al., Demonstrating the Feasibility of Using Forearm Electromyography for Muscle-Computer Interfaces. CHI 2008 Proceedings. Physiological Sensing for Input. 2008:515-24.
Saponas et al., Enabling Always-Available Input with Muscle-Computer Interfaces. UIST '09. 2009:167-76.
Saponas et al., Making Muscle-Computer Interfaces More Practical. CHI 2010: Brauns and Brawn. 2010:851-4.
Sartori et al., Neural Data-Driven Musculoskeletal Modeling for Personalized Neurorehabilitation Technologies. IEEE Transactions on Biomedical Engineering. 2016;63(5):879-93.
Sauras-Perez et al., A Voice and Pointing Gesture Interaction System for Supporting Human Spontaneous Decisions in Autonomous Cars. Clemson University. All Dissertations. 2017. 174 pages.
Shen et al., I am a Smartwatch and I can Track my User's Arm. University of Illinois at Urbana-Champaign. MobiSys' 16. 12 pages.
Son et al., Evaluating the utility of two gestural discomfort evaluation methods. Plos One. 2017. 21 pages.
Strbac et al., Microsoft Kinect-Based Artificial Perception System for Control of Functional Electrical Stimulation Assisted Grasping. Hindawi Publishing Corporation. BioMed Research International. 2014. 13 pages.
Torres, Myo Gesture Control Armband. PCMag. Https://www.pcmag.com/article2/0,2817,2485462,00.asp 2015. 9 pages.
Valero-Cuevas et al., Computational Models for Neuromuscular Function. NIH Public Access Author Manuscript. Jun. 16, 2011. 52 pages.
Wittevrongel et al., Spatiotemporal Beamforming: A Transparent and Unified Decoding Approach to Synchronous Visual Brain-Computer Interfacing. Frontiers in Neuroscience. 2017;11:1-12.
Wodzinski et al., Sequential Classification of Palm Gestures Based on A* Algorithm and MLP Neural Network for Quadrocopter Control. Metrol. Meas. Syst., 2017;24(2):265-76.
Xue et al., Multiple Sensors Based Hand Motion Recognition Using Adaptive Directed Acyclic Graph. Applied Sciences. MDPI. 2017;7(358):1-14.
Yang et al., Surface EMG based handgrip force predictions using gene expression programming. Neurocomputing. 2016;207:568-579.
Zacharaki et al., Spike pattern recognition by supervised classification in low dimensional embedding space. Brain Informatics. 2016;3:73-8. DOI: 10.1007/s40708-016-0044-4.
International Search Report and Written Opinion received for PCT Application Serial No. PCT/US2019/053234 dated Jan. 16, 2020, 9 pages.

\* cited by examiner

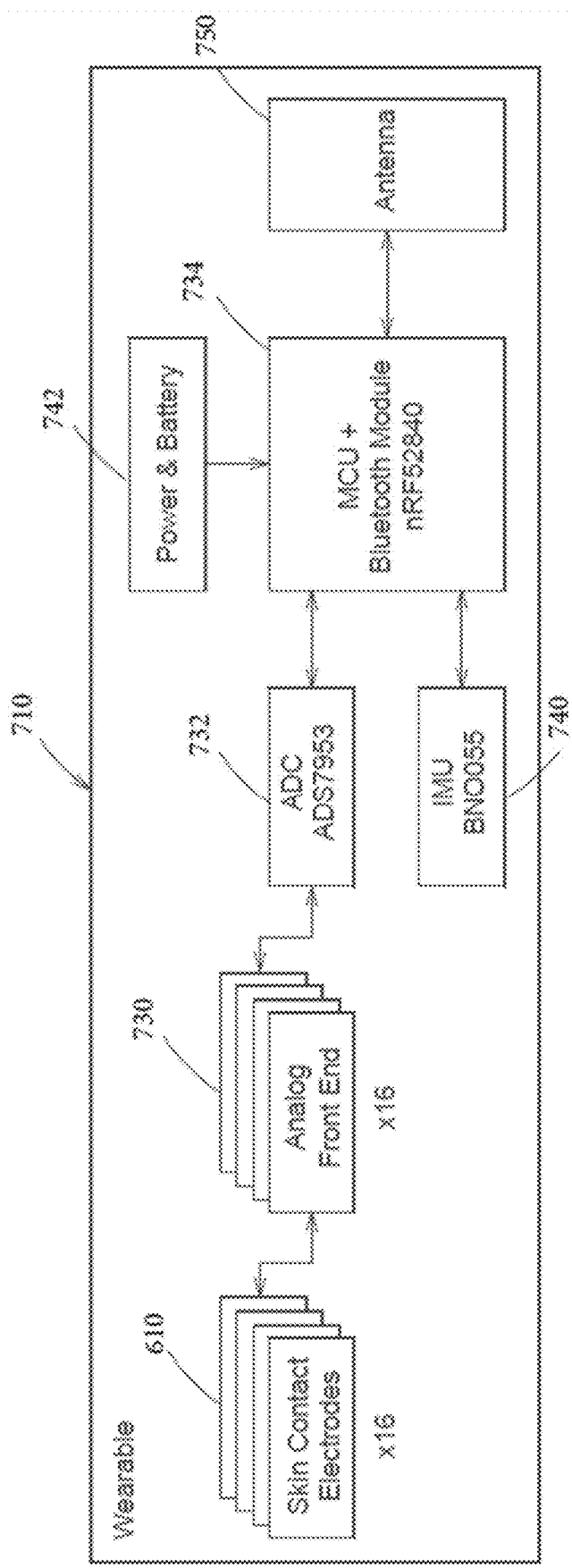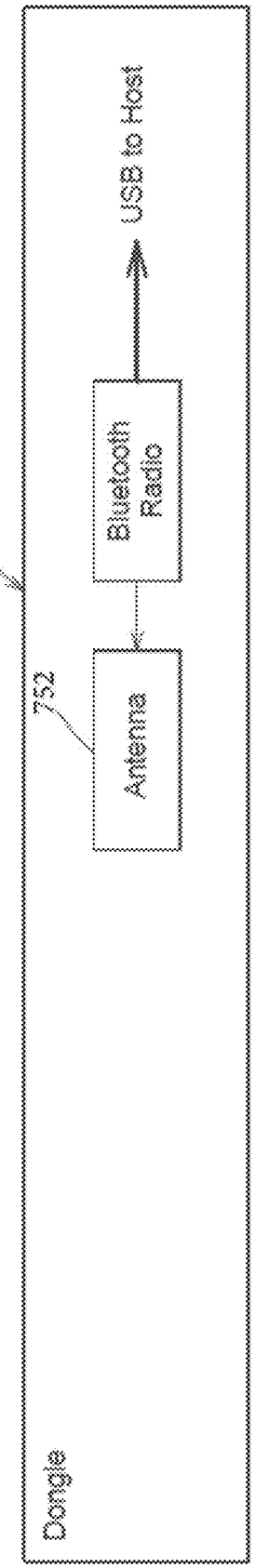
FIG. 7A
FIG. 7B

NEUROMUSCULAR CONTROL OF PHYSICAL OBJECTS IN AN ENVIRONMENT

This application claims the benefit under 35 U.S.C. § 119(e) of U.S. Provisional Patent Application Ser. No. 62/736,929, filed Sep. 26, 2018, entitled "NEUROMUSCULAR CONTROL OF OBJECTS IN AN ENVIRONMENT," and claims the benefit under 35 U.S.C. § 119(e) of U.S. Provisional Patent Application Ser. No. 62/866,505, filed Jun. 25, 2019, entitled "SYSTEM AND APPARATUS FOR MULTIMODAL CONNECTED DEVICE CONTROL BASED ON NEUROMUSCULAR SIGNALS," the entire contents of each of which is incorporated by reference herein.

BACKGROUND

Traditionally non-network connected devices including lamps, thermostats, and speakers, household electronics such as microwaves, refrigerators, and gas fireplaces, or other "dumb" objects/devices are increasingly being embedded with technology that allows the devices to communicate and interact over a network (e.g., the Internet) to enable various operations of the devices to be remotely controlled. The network of connected devices is often referred to in popular culture as the "Internet of Things" (IoT) and network-enabled devices in an IoT network are often referred to as IoT devices. Some conventional techniques for controlling IoT device operation involve control of the device using an application installed on network-enabled computing devices such as a desktop computer, laptop computer, tablet computer, smartwatch or smartphone.

SUMMARY

Some embodiments are directed to techniques for providing neuromuscular control of one or more operations of a physical object (e.g., an IoT device) in a user's environment. As described in more detail below, one or more wearable devices having neuromuscular sensors are configured to detect and/or record a plurality of neuromuscular signals. The detected and/or recorded neuromuscular signals are interpreted by one or more computer processors to provide for selection of an object in the user's environment and/or to control an operation of an object in the user's environment subsequent to its selection. In some embodiments, feedback is provided to the user to enable the user to determine whether their intention to select and/or control an object in their environment was interpreted correctly by the system.

Some embodiments are directed to a computerized system for controlling objects in an environment based, at least in part, on neuromuscular signals. The system comprises a plurality of neuromuscular sensors configured to detect and/or record a plurality of neuromuscular signals from a user, wherein the plurality of neuromuscular sensors are arranged on one or more wearable devices, and at least one computer processor programmed to control, based at least in part on the plurality of neuromuscular signals and/or information based on the plurality of neuromuscular signals, an operation of a selected object within an environment.

Some embodiments are directed to a method performed by a computerized system for controlling objects in an environment based, at least in part, on neuromuscular signals. The method comprises detecting and/or recording a plurality of neuromuscular signals from a plurality of neuromuscular sensors arranged on one or more wearable devices worn by a user, and controlling, based at least in part on the plurality of neuromuscular signals and/or information based on the plurality of neuromuscular signals, an operation of a selected object within an environment.

Some embodiments are directed to a computerized system for controlling a physical object in an environment based, at least in part, on neuromuscular signals. The system comprises a plurality of neuromuscular sensors configured to record a plurality of neuromuscular signals from a user, wherein the plurality of neuromuscular sensors are arranged on one or more wearable devices, and at least one computer processor. The at least one computer processor is programmed to receive a selection of a physical object within the environment, and control, based at least in part on the plurality of neuromuscular signals and/or information based on the plurality of neuromuscular signals, an operation of the selected physical object within the environment.

In one aspect, receiving the selection of the physical object within the environment comprises determining the selection of the physical object based, at least in part, on the plurality of neuromuscular signals and/or the information derived from the plurality of neuromuscular signals.

In another aspect, the system further comprises at least one storage device configured to store information describing an association between the plurality of neuromuscular signals and one or more selectable physical objects in the environment, and determining the selection of the physical object is based, at least in part, on the stored information describing an association between the plurality of neuromuscular signals and the one or more selectable physical objects in the environment.

In another aspect, at least some of the one or more selectable physical objects in the environment are connected in the environment using at least one short range communication protocol.

In another aspect, the stored information describing an association between the plurality of neuromuscular signals and the one or more selectable objects in the environment comprises at least one inference model configured to map the plurality of neuromuscular signals to the one or more selectable physical objects in the environment.

In another aspect, the at least one computer processor is further programmed to identify a muscular activation state, based on the plurality of neuromuscular signals and/or the information derived from the plurality of neuromuscular signals, and receiving the selection of the physical object within the environment is based, at least in part, on the identified muscular activation state.

In another aspect, receiving the selection of the physical object within the environment based, at least in part, on the identified muscular activation state comprises using the muscular activation state to interact with a user interface to select from among one of a plurality of selectable physical objects.

In another aspect, the muscular activation state comprises a gesture, a pose, or a sub-muscular activation state.

In another aspect, receiving the selection of the physical object within the environment comprises automatically selecting the physical object based, at least in part, on user context and/or user behavior.

In another aspect, receiving the selection of the physical object within the environment is based, at least in part, on a proximity of the physical object to the user in the environment.

In another aspect, the at least one computer processor is further programmed to detect that the computerized system is within a particular range of a selectable physical object in the environment, and establish a near field communication between the computerized system and the selectable physical object in response to the detection, and receiving a selection of the physical object within the environment is based, at least in part, on the established near field communication.

In another aspect, the system further comprises an infrared receiver configured to receive infrared signals from one or more physical objects, and receiving the selection of the physical object within the environment is based, at least in part, on an infrared signal received by the infrared receiver.

In another aspect, the system further comprises an infrared transmitter configured to transmit a broadcast infrared signal to the one or more physical objects, wherein the infrared signals received by the infrared receiver is received in response to transmitting the broadcast infrared signal.

In another aspect, the environment is an augmented reality environment generated by an augmented reality system.

In another aspect, the augmented reality system is configured to display a user interface within the augmented reality environment, and receiving a selection of the object comprises receiving the selection of the object via the user interface.

In another aspect, receiving a selection of the physical object comprises determining the selection of the physical object based, at least in part, by the plurality of neuromuscular signals and/or the information derived from the plurality of neuromuscular signals.

In another aspect, the at least one computer processor is further programmed to generate a control signal based, at least in part, on the plurality of neuromuscular signals and/or the information derived from the plurality of neuromuscular signals, and provide the control signal to the augmented reality system, and receiving the selection of the physical object in the environment is based, at least in part, on the control signal provided to the augmented reality system.

In another aspect, the augmented reality system is configured to display a cursor in the augmented reality environment, the control signal is for controlling a display position of the cursor in the augmented reality environment, and receiving the selection of the physical object in the environment is based, at least in part, on the display position of the cursor in the augmented reality environment.

In another aspect, the augmented reality system includes at least one camera and/or eye tracking system, and receiving the selection of the physical object in the environment is based, at least in part, on information captured by the at least one camera and/or eye tracking system.

In another aspect, receiving the selection of the physical object in the environment is further based, at least in part, on the plurality of neuromuscular signals and/or the information derived from the plurality of neuromuscular signals.

In another aspect, receiving a selection of the physical object within the environment comprises dividing the environment into a plurality of spatial areas, determining based, at least in part, on an orientation of an inertial measurement unit. which of the plurality of spatial areas the user is pointing to, and selecting the physical object within the spatial area to which the user is pointing.

In another aspect, the system further comprises a simultaneous location and mapping system, and receiving the selection of the physical object in the environment is based, at least in part, on information determined by the simultaneous location and mapping system.

In another aspect, receiving the selection of the physical object in the environment is based, at least in part, on information captured by at least one microphone.

In another aspect, the computerized system is configured to provide an indication to the user that the physical object has been selected.

In another aspect, the selected physical object is configured to provide the indication to the user upon selection.

In another aspect, the at least one computer processor is further programmed to provide the indication to the user upon selection of the physical object.

In another aspect, the environment is an augmented reality environment generated by an augmented reality system, the physical object is a physical object viewed in the augmented reality environment, and the augmented reality system is configured to provide the indication to the user upon selection of the physical object viewed in the augmented reality environment.

In another aspect, providing an indication that the physical object has been selected comprises presenting a visual indication within the augmented reality environment.

In another aspect, the system further comprises at least one storage device configured to store information describing an association between the plurality of neuromuscular signals and at least one control action for each of one or more selectable physical objects in the environment, and controlling an operation of the selected object comprises determining the operation to control based, at least in part, on the stored information describing an association between the plurality of neuromuscular signals and the at least one control action for the selected physical object.

In another aspect, the stored information describing an association between the plurality of neuromuscular signals and the at least one control action for each of the one or more selectable physical objects in the environment comprises at least one inference model trained to map the plurality of neuromuscular signals to the at least one control action for each of the one or more selectable physical objects in the environment.

In another aspect, the at least one computer processor is further programmed to identify a muscular activation state, based on the plurality of neuromuscular signals and/or the information derived from the plurality of neuromuscular signals, and controlling an operation of the selected physical object is performed based, at least in part, on the identified muscular activation state.

In another aspect, the muscular activation state comprises a gesture, a pose, or a sub-muscular activation state.

In another aspect, the environment is an augmented reality environment generated by an augmented reality system, and controlling the operation of the selected physical object within the environment comprises controlling the operation of the selected physical object via input provided to the augmented reality system.

In another aspect, the augmented reality system is configured to display a control interface within the augmented reality environment, and controlling the operation of the selected physical object comprises controlling the operation of the object via a user interaction with the control interface.

In another aspect, controlling the operation of the selected physical object comprises generating a control signal based, at least in part, on the plurality of neuromuscular signals and/or the information derived from the plurality of neuromuscular signals, and providing the control signal to the augmented reality system to interact with the control interface displayed in the augmented reality environment.

In another aspect, the augmented reality system is configured to display the control interface at a first location in the augmented reality environment, the selected physical object viewed in the augmented reality environment is located at a second location in the augmented reality environment, and the first location is closer to the user than the second location in the augmented reality environment.

In another aspect, the augmented reality system is configured to provide feedback to the user in response to the interaction with the control interface.

In another aspect, the feedback comprises visual feedback, auditory feedback, and/or haptic feedback.

In another aspect, the augmented reality system is configured to display a first control interface for a first object and a second control interface for a second object in the augmented reality environment.

In another aspect, the augmented reality system is configured to display the first control interface when the first object is selected and the second control interface when the second object is selected.

In another aspect, the at least one computer processor is further programmed to detect, based at least in part on the plurality of neuromuscular signals and/or information based on the plurality of neuromuscular signals, a first muscular activation state indicating a desire to control an operation of the selected physical object.

In another aspect, the first muscular activation state is a wake-up muscular activation state for the selected physical object.

In another aspect, the at least one computer processor is further programmed to send an instruction to the selected physical object to enable or disable a user interface of the selected physical object in response to detecting the first muscular activation state.

In another aspect, sending an instruction to the selected physical object comprises sending an instruction to enable the user interface, and the at least one computer processor is further programmed to detect, based at least in part on the plurality of neuromuscular signals and/or information based on the plurality of neuromuscular signals, a second muscular activation state, wherein controlling an operation of the selected physical object comprises controlling an operation of the selected physical object based, at least in part, on the second muscular activation state.

Some embodiments are directed to a method and/or at least one non-transitory computer-readable storage medium storing instructions that, when executed by at least one computer processor, causes the at least one computer processor to perform the method. The method comprises recording a plurality of neuromuscular signals from a plurality of neuromuscular sensors arranged on one or more wearable devices worn by a user, receiving a selection of a physical object within the environment, and controlling, based at least in part on the plurality of neuromuscular signals and/or information based on the plurality of neuromuscular signals, an operation of the selected physical object within the environment.

In one aspect, receiving the selection of the physical object within the environment comprises determining the selection of the physical object based, at least in part, on the plurality of neuromuscular signals and/or the information derived from the plurality of neuromuscular signals.

In another aspect, determining the selection of the physical object is based, at least in part, on stored information describing an association between the plurality of neuromuscular signals and one or more selectable physical objects in the environment.

In another aspect, the method further comprises identifying a muscular activation state, based on the plurality of neuromuscular signals and/or the information derived from the plurality of neuromuscular signals, and receiving the selection of the physical object within the environment is based, at least in part, on the identified muscular activation state.

In another aspect, receiving the selection of the physical object within the environment based, at least in part, on the identified muscular activation state comprises using the muscular activation state to interact with a user interface to select from among one of a plurality of selectable physical objects.

In another aspect, receiving the selection of the physical object within the environment comprises automatically selecting the physical object based, at least in part, on user context and/or user behavior.

In another aspect, receiving the selection of the physical object within the environment is based, at least in part, on a proximity of the physical object to the user in the environment.

In another aspect, the method further comprises detecting that the computerized system is within a particular range of a selectable physical object in the environment, and establishing a near field communication between the computerized system and the selectable physical object in response to the detection, and receiving a selection of the physical object within the environment is based, at least in part, on the established near field communication.

In another aspect, the method further comprises receiving an infrared signal, and receiving the selection of the physical object within the environment is based, at least in part, on the received infrared signal.

In another aspect, the method further comprises transmitting a broadcast infrared signal to the one or more physical objects, and the infrared signals received by the infrared receiver is received in response to transmitting the broadcast infrared signal.

In another aspect, the environment is an augmented reality environment generated by an augmented reality system, the augmented reality system is configured to display a user interface within the augmented reality environment, and receiving a selection of the object comprises receiving the selection of the object via the user interface.

In another aspect, receiving a selection of the physical object comprises determining the selection of the physical object based, at least in part, by the plurality of neuromuscular signals and/or the information derived from the plurality of neuromuscular signals.

In another aspect, the method further comprises generating a control signal based, at least in part, on the plurality of neuromuscular signals and/or the information derived from the plurality of neuromuscular signals, and providing the control signal to the augmented reality system, and receiving the selection of the physical object in the environment is based, at least in part, on the control signal provided to the augmented reality system.

In another aspect, receiving a selection of the physical object within the environment comprises dividing the environment into a plurality of spatial areas, determining based, at least in part, on an orientation of an inertial measurement unit. which of the plurality of spatial areas the user is pointing to, and selecting the physical object within the spatial area to which the user is pointing.

In another aspect, the method further comprises providing an indication to the user that the physical object has been selected.

In another aspect, the environment is an augmented reality environment generated by an augmented reality system, the physical object is a physical object viewed in the augmented reality environment, and the augmented reality system is configured to provide the indication to the user upon selection of the physical object viewed in the augmented reality environment.

In another aspect, the method further comprises storing, on at least one storage device, information describing an association between the plurality of neuromuscular signals and at least one control action for each of one or more selectable physical objects in the environment, and controlling an operation of the selected object comprises determining the operation to control based, at least in part, on the stored information describing an association between the plurality of neuromuscular signals and the at least one control action for the selected physical object.

In another aspect, the method further comprises identifying a muscular activation state, based on the plurality of neuromuscular signals and/or the information derived from the plurality of neuromuscular signals, and controlling an operation of the selected physical object is performed based, at least in part, on the identified muscular activation state.

In another aspect, the environment is an augmented reality environment generated by an augmented reality system, and controlling the operation of the selected physical object within the environment comprises controlling the operation of the selected physical object via input provided to the augmented reality system.

In another aspect, the method further comprises detecting, based at least in part on the plurality of neuromuscular signals and/or information based on the neuromuscular signals, a first muscular activation state indicating a desire to control an operation of the selected physical object.

In another aspect, the first muscular activation state is a wake-up muscular activation state for the selected physical object.

In another aspect, the method further comprises sending an instruction to the selected physical object to enable or disable a user interface of the selected physical object in response to detecting the first muscular activation state.

In another aspect, sending an instruction to the selected physical object comprises sending an instruction to enable the user interface, and the method further comprises detecting, based at least in part on the plurality of neuromuscular signals and/or information based on the plurality of neuromuscular signals, a second muscular activation state, and controlling an operation of the selected physical object comprises controlling an operation of the selected physical object based, at least in part, on the second muscular activation state.

Some embodiments are directed to a computerized system for controlling a physical object in an environment based, at least in part, on neuromuscular signals. The system comprises a plurality of neuromuscular sensors configured to record a plurality of neuromuscular signals from a user, wherein the plurality of neuromuscular sensors are arranged on one or more wearable devices, and at least one computer processor. The at least one computer processor is programmed to select a physical object within an environment of the user, provide feedback to the user indicating that the physical object has been selected, determine a first muscular activation state, based, at least in part, on the plurality of neuromuscular signals and/or information based on the plurality of neuromuscular signals, and control an operation of the selected physical object based, at least in part, on the determined first muscular activation state.

In one aspect, the system further comprises at least one storage device configured to store information describing an association between one or more selectable physical objects in the environment and a plurality of muscular activation states, and selecting the physical object within the environment is based, at least in part, on the stored information.

In another aspect, the plurality of neuromuscular signals used, at least in part, to determine the first muscular activation state are recorded during a first time period, the at least one computer processor is further programmed to determine a second muscular activation state based, at least in part, on a plurality of neuromuscular signals and/or information based on the plurality of neuromuscular signals recorded during a second time period, and selecting the physical object within the environment of the user is based, at least in part, on the determined second muscular activation state.

In another aspect, selecting the physical object is based, at least in part, on user context and/or user behavior.

In another aspect, the at least one computer processor is further programmed to receive speech input from the user, and selecting the physical object is based, at least in part, on the received speech input.

In another aspect, selecting the physical object is based, at least in part, on a proximity of the user to the physical object.

In another aspect, selecting the physical object is based, at least in part, on a proximity of the user to the physical object relative to other selectable physical objects in the environment of the user.

In another aspect, providing feedback to the user indicating that the physical object has been selected comprises instructing the selected physical object to provide the feedback.

In another aspect, providing feedback to the user indicating that the physical object has been selected comprises providing one or more of auditory feedback and vibratory feedback.

In another aspect, the system further comprises at least one storage device configured to store information describing an association between at least one control action for each of one or more selectable physical objects in the environment and a corresponding muscular activation state including the first muscular activation state, and controlling an operation of the selected physical object is based, at least in part, on the stored information describing an association between the at least one control action for the selected physical object and the first muscular activation state.

In another aspect, the at least one computer processor is further programmed to detect, based at least in part on the plurality of neuromuscular signals and/or information based on the plurality of neuromuscular signals, a second muscular activation state indicating a desire to control an operation of the selected physical object.

In another aspect, the at least one computer processor is further programmed to send an instruction to the selected physical object to enable or disable a user interface of the selected physical object in response to detecting the second muscular activation state, wherein sending an instruction to the selected physical object comprises sending an instruction to enable the user interface, and control an operation of the selected physical object based, at least in part, on the first muscular activation state after the user interface has been enabled.

Some embodiments are directed to a method and/or at least one non-transitory computer-readable storage medium storing instructions that, when executed by at least one computer processor, causes the at least one computer processor to perform the method. The method comprises recording a plurality of neuromuscular signals from a plurality of neuromuscular sensors arranged on one or more wearable devices, selecting a physical object within an environment of the user, providing feedback to the user indicating that the physical object has been selected, determining a first muscular activation state, based, at least in part, on the plurality of neuromuscular signals and/or information based on the plurality of neuromuscular signals, and controlling an operation of the selected physical object based, at least in part, on the determined first muscular activation state.

In one aspect, the method further comprises storing, on at least one storage device, information describing an association between one or more selectable physical objects in the environment and a plurality of muscular activation states, and selecting the physical object within the environment is based, at least in part, on the stored information.

In another aspect, selecting the physical is further based, at least in part, on user context and/or user behavior.

In another aspect, the method further comprises receiving speech input from the user, and selecting the physical object is based, at least in part, on the received speech input.

In another aspect, selecting the physical object is based, at least in part, on a proximity of the user to the physical object.

In another aspect, providing feedback to the user indicating that the physical object has been selected comprises instructing the selected physical object to provide the feedback.

In another aspect, the method further comprises storing, by at least one storage device, information describing an association between at least one control action for each of one or more selectable physical objects in the environment and a corresponding muscular activation state including the first muscular activation state, and controlling an operation of the selected physical object is based, at least in part, on the stored information describing an association between the at least one control action for the selected physical object and the first muscular activation state.

In another aspect, the method further comprises detecting, based at least in part on the plurality of neuromuscular signals and/or information based on the plurality of neuromuscular signals, a second muscular activation state indicating a desire to control an operation of the selected physical object, and sending an instruction to the selected physical object to enable or disable a user interface of the selected physical object in response to detecting the second muscular activation state.

In another aspect, sending an instruction to the selected physical object comprises sending an instruction to enable the user interface, and the method further comprises controlling an operation of the selected physical object based, at least in part, on the first muscular activation state after the user interface has been enabled.

In another aspect, the plurality of neuromuscular signals used, at least in part, to determine the first muscular activation state are recorded during a first time period, the method further comprises determining a second muscular activation state based, at least in part, on a plurality of neuromuscular signals and/or information based on the plurality of neuromuscular signals recorded during a second time period, and selecting the physical object within the environment of the user is based, at least in part, on the determined second muscular activation state.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

FIGS. 7A and 7B schematically illustrate components of a computer-based system in which some embodiments of the technology described herein are implemented. FIG. 7A illustrates a wearable portion of the computer-based system, and FIG. 7B illustrates a dongle portion connected to a computer, wherein the dongle portion is configured to communicate with the wearable portion;

DETAILED DESCRIPTION

Figure 1:
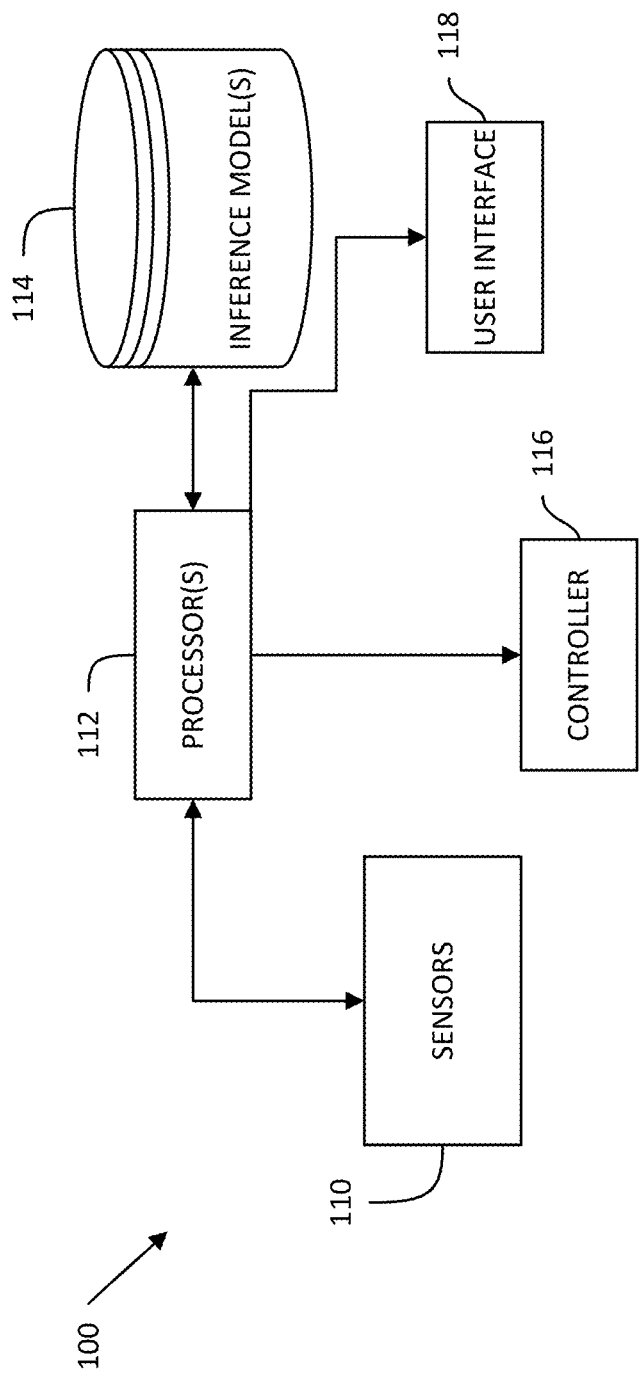
FIG. 1 is a schematic diagram of a computer-based system for controlling objects in an environment using neuromuscular signals in accordance with some embodiments of the technology described herein.

The inventors have invented novel systems and techniques for selecting and/or controlling physical objects (e.g., IoT devices) in a user's environment based, at least in part, on neuromuscular signals recorded or detected by neuromuscular sensors arranged on one or more wearable devices worn by the user. Per various embodiments of the invention, a number of muscular activation states of a user may be identified from the recorded and/or detected signals and/or information based on the signals, to enable improved selection and/or control of objects in the user's environment when those objects are configured to receive control signals.

The control of the objects can be performed directly from a neuromuscular activity device or indirectly via another system such as an augmented reality (AR) system or any extended or cross reality system (XR system or environment), including but not limited to mixed reality (MR), virtual reality (VR), etc.

The novel systems and techniques disclosed herein overcome one or more of the issues associated with, for example: (i) having to directly interact with devices by being in close physical proximity to the device, (ii) the inflexible and restrictive nature of current interfaces, (iii) the awkwardness of a one-way voice interaction with an object or device (e.g., feedback may not be provided), (iv) poor performance when the user is far away from the device or in a noisy environment, (v) a lack of privacy in controlling the object (e.g., other people near the user may overhear the control commands), and/or (vi) cumbersome, inconsistent, or inefficient interactions with various applications used to control the operation(s) of the device.

Per various embodiments of the invention, one or more operations of physical objects and devices may be controlled based, at least part, on the identified muscular activation states of a user. An operation of the object or device may include any aspect of the object or device that the user can control based on the recorded or detected signals. Muscular activation states may include, but are not limited to, a static gesture or pose performed by the user, a dynamic gesture performed by the user, a sub-muscular activation state of the user, a muscular tensing or relaxation performed by the user, or any combination of the foregoing (collectively and individually, "muscular activation states"). Identification of a number of muscular activation states allows for a layered or multi-level approach to controlling operation of the object. For instance, at a first layer/level, one muscular activation state may indicate that the object in the environment is to be selected for control; at a second layer/level, another muscular activation state may indicate the particular operation of the object to control; and at a third layer/level, yet another muscular activation state may indicate how the operation of the object is to be controlled. It will be appreciated that any number of muscular activation states and layers may be used without departing from the scope of this disclosure. For example, in some embodiments, a single muscular activation state may both select the object to control and indicate the operation of the object to be controlled.

In one exemplary embodiment, neuromuscular and/or auxiliary sensor signals may be recorded or detected while the user performs a first gesture. The first gesture identified based on the sensor signals may indicate that a user wants to control an operation/aspect (e.g., temperature setting) of a selected device (e.g., a network-connected or "smart" thermostat) in the user's environment. In response to the system detecting the first gesture, a temperature dial associated with the thermostat may be displayed by the thermostat or some other feedback may be provided to the user to indicate to the user that the thermostat is in a "temperature control" mode. Sensor signals may continue to be recorded or detected while the user performs a second gesture. In response to detecting the second gesture or a series of gestures, the temperature setting of the thermostat may be controlled so the user can adjust the desired temperature. For example, one or more clockwise rotating gestures may indicate that the user wants to turn the temperature up, whereas one or more counterclockwise rotating gestures may indicate that the user wants to turn the temperature down. Based on the sensor signals associated with these actions, the disclosed exemplary embodiment can recognize the particular gesture(s) and/or series of gestures and can adjust the temperature setting of the thermostat being controlled.

As used herein, the term "gestures" refers to a static or dynamic configuration of one or more body parts including the position of the one or more body parts and forces associated with the configuration. For example, gestures include discrete gestures or "poses", such as pressing the palm of a hand down on a solid surface or grasping a ball, continuous gestures, such as a waving a finger back and forth or throwing a ball, or a combination of discrete and continuous gestures such as grasping and throwing a ball. Gestures may be defined by an application configured to prompt a user to perform the gestures or, alternatively, gestures may be arbitrarily defined by a user. In some cases, hand and arm gestures may be symbolic and used to communicate according to cultural standards.

According to some embodiments, muscular activation states may be identified, at least in part, from raw (e.g., unprocessed) sensor signals collected by one or more of the wearable sensors. In some embodiments, the muscular activation states may be identified, at least in part, from information based on processed sensor signals, where the raw sensor signals collected by one or more of the wearable sensors are processed using one or more of amplification, filtering, rectification, and/or other forms of signal processing. In some embodiments, the muscular activation states may be identified, at least in part, from an output of one or more trained inference models, which may comprise statistical model(s) that receive the sensor signals (or processed versions of the sensor signals) as one or more inputs.

Per exemplary embodiments of the invention, the muscular activation states as determined based on recorded or detected sensor signals may be used to control various aspects/operations of the objects, thereby reducing the need to rely on cumbersome and inefficient input devices. For example, sensor data may be detected and/or recorded, and muscular activation states may be identified from the obtained sensor data without the user having to (1) be in close physical proximity to the object being controlled or (2) remember complicated button or key manipulation sequences to control operations of the object. To this end, some embodiments are directed to techniques for naturally and intuitively controlling objects in the user's environment without having to (i) use manufacturer provided remote controls, (ii) be in close proximity to the objects to be controlled, or (iii) use other inflexible control techniques. Also, per embodiments of the invention, the identification of the muscular activation state(s) from the obtained sensor data can be performed relatively fast, thereby reducing the response times and latency associated with controlling an operation of the object. Furthermore, some embodiments enable the control of the object to be user customizable such that each user may define a user-specific control scheme for controlling one or more aspects/operations of objects in the user's environment.

As described briefly above, in some embodiments, various muscular activation states may be identified directly from recorded or detected sensor data. In other embodiments, the muscular activation states may be identified indirectly, including based, at least in part, on one or more outputs of one or more trained inference models. In some embodiments, the trained inference model(s) may output one or more motor unit or muscle activations, and/or position, orientation, and/or force estimates for segments of a computer-generated musculoskeletal model. In one exemplary embodiment, all or portions of the human musculoskeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. In this example, a multi-segment articulated rigid body system can be used to model portions of the human musculoskeletal system. However, it should be appreciated that some segments of the human musculoskeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies. It will be appreciated that physical models other than the multi-segment articulated rigid body system may be used to model portions of the human musculoskeletal system without departing from the scope of this disclosure.

Further, in kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, the hand may be modeled as a multi-segment articulated body with the joints in the wrist and each finger forming the interfaces between the multiple segments in the model. In some embodiments, movements of the segments in the rigid body model can be simulated as an articulated rigid body system in which position (e.g., actual position, relative position, or orientation) information of a segment relative to other segments in the model are predicted using a trained inference model, as described in more detail below.

The portion of the human body approximated by a musculoskeletal representation as described herein as one non-limiting example, is a hand or a combination of a hand with one or more arm segments. The information used to describe a current state of the positional relationships between segments, force relationships for individual segments or combinations of segments, and muscle and motor unit activation relationships between segments, in the musculoskeletal representation is referred to herein as the handstate of the musculoskeletal representation. It should be appreciated, however, that the techniques described herein are also applicable to musculoskeletal representations of portions of the body other than the hand including, but not limited to, an arm, a leg, a foot, a torso, a neck, or any combination of the foregoing.

In addition to spatial (e.g., position/orientation) information, some embodiments of the invention are configured to predict force information associated with one or more segments of the musculoskeletal representation. For example, linear forces or rotational (torque) forces exerted by one or more segments may be estimated. Examples of linear forces include, but are not limited to, the force of a finger or hand pressing on a solid object such as a table, and a force exerted when two segments (e.g., two fingers) are pinched together. Examples of rotational forces include, but are not limited to, rotational forces created when segments in the wrist or fingers are twisted or flexed. In some embodiments, the force information determined as a portion of a current handstate estimate includes one or more of pinching force information, grasping force information, or information about co-contraction forces between muscles represented by the musculoskeletal representation.

FIG. 1 illustrates a system 100, for example, a neuromuscular activity system, in accordance with some embodiments of the invention. The system includes one or more sensors 110 configured to detect and/or record signals relating to the activation of motor units within one or more portions of a human body. Sensors 110 may include a plurality of neuromuscular sensors configured to detect and/or record signals arising from neuromuscular activity in skeletal muscle of a human body. The term "neuromuscular activity" as used herein refers to neural activation of spinal motor neurons that innervate a muscle, muscle activation, muscle contraction, or any combination of the foregoing. In some embodiments, information for selecting and/or controlling objects in a user's environment may be determined based at least in part on sensed and/or detected neuromuscular signals and/or motor unit activity.

Sensors 110 may include one or more Inertial Measurement Units (IMUs), which measure a combination of physical aspects of motion, using, for example, an accelerometer, a gyroscope, a magnetometer, or any combination of the foregoing. In some embodiments, IMUs may be used to sense information about movement of the part(s) of the body on which the IMU is attached and information derived from the detected data (e.g., position and/or orientation information) may be tracked as the user moves over time. For example, one or more IMUs may be used to track movements of portions of a user's body proximal to the user's torso relative to the sensor (e.g., arms, legs) as the user moves over time.

In embodiments that include at least one IMU and a plurality of neuromuscular sensors, the IMU(s) and neuromuscular sensors may be arranged to detect movement of the same or different parts of the human body. For example, the IMU(s) may be arranged to detect movements of one or more body segments proximal to the torso (e.g., an upper arm), whereas the neuromuscular sensors may be arranged to detect motor unit activity within one or more body segments distal to the torso (e.g., a forearm or wrist). It should be appreciated, however, that the sensors may be arranged in any suitable way, and embodiments of the technology described herein are not limited based on any particular sensor arrangement. For example, in some embodiments, at least one IMU and a plurality of neuromuscular sensors may be co-located on a body segment to track motor unit activity and/or movements of the body segment using different types of measurements. In one implementation described in more detail below, an IMU sensor and a plurality of EMG sensors are arranged on a wearable device configured to be worn around the lower arm or wrist of a user. In such an arrangement, the IMU sensor may be configured to track movement information (e.g., positioning and/or orientation over time) associated with one or more arm segments, to determine, for example whether the user has raised or lowered their arm, whereas the EMG sensors may be configured to determine sub-muscular information associated with activation of sub-muscular structures in muscles of the wrist or hand.

As the tension of a muscle increases during performance of a motor task, the firing rates of active neurons increases and additional neurons may become active, which is a process referred to as motor unit recruitment. The pattern by which neurons become active and increase their firing rate is stereotyped, such that the expected motor unit recruitment patterns define an activity manifold associated with standard or normal movement. Some embodiments record activation of a single motor unit or a group of motor units that are "off-manifold," in that the pattern of motor unit activation is different than an expected or typical motor unit recruitment pattern. Such off-manifold activation is referred to herein as, "sub-muscular activation" or "activation of a sub-muscular structure," where a sub-muscular structure refers to the single motor unit or the group of motor units associated with the off-manifold activation. Examples of off-manifold motor unit recruitment patterns include, but are not limited to, selectively activating a high-threshold motor unit without activating a lower-threshold motor unit that would normally be activated earlier in the recruitment order and modulating the firing rate of a motor unit across a substantial range without modulating the activity of other neurons that would normally be co-modulated in typical motor recruitment patterns. In some embodiments, the plurality of neuromuscular sensors may be used to sense sub-muscular activation without observable movement. Sub-muscular activation may be used, at least in part, to control objects in a user's environment in accordance with some embodiments of the technology described herein.

Each of the sensors 110 includes one or more sensing components configured to sense information about a user or their environment. In the case of IMUs, the sensing components may include one or more accelerometers, gyroscopes, magnetometers, or any combination thereof, to measure characteristics of body motion, examples of which include, but are not limited to, acceleration, angular velocity, and sensed magnetic field around the body. In the case of neuromuscular sensors, the sensing components may include, but are not limited to, electrodes configured to detect electric potentials on the surface of the body (e.g., for EMG sensors), vibration sensors configured to measure skin surface vibrations (e.g., for MMG sensors), and/or acoustic sensing components configured to measure ultrasound signals (e.g., for SMG sensors) arising from muscle activity.

In some embodiments, at least some of the plurality of sensors are arranged as a portion of a wearable device configured to be worn on or around part of a user's body. For example, in one non-limiting example, an IMU sensor and a plurality of neuromuscular sensors are arranged circumferentially around an adjustable and/or elastic band such as a wristband or armband configured to be worn around a user's wrist or arm. Alternatively, at least some of the sensors may be arranged on a wearable patch configured to be affixed to a portion of the user's body. In some embodiments, multiple wearable devices, each having one or more IMUs and/or neuromuscular sensors included thereon may be used to generate selection and/or control information based on activation from sub-muscular structures and/or movement that involve one or more parts of the body.

Figure 4:
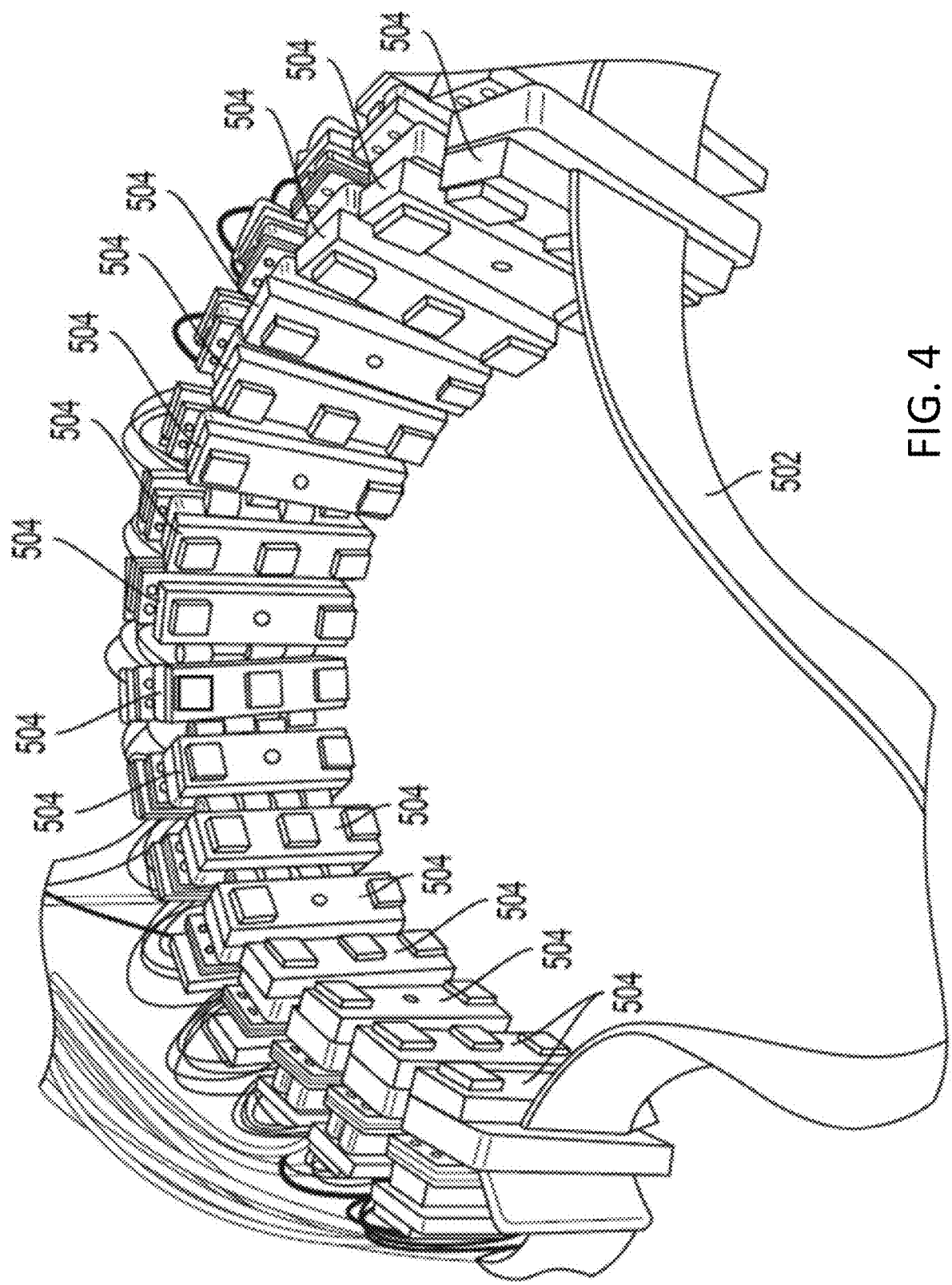
FIG. 4 illustrates a wristband having EMG sensors arranged circumferentially thereon in accordance with some embodiments of the technology described herein.
Figure 5:
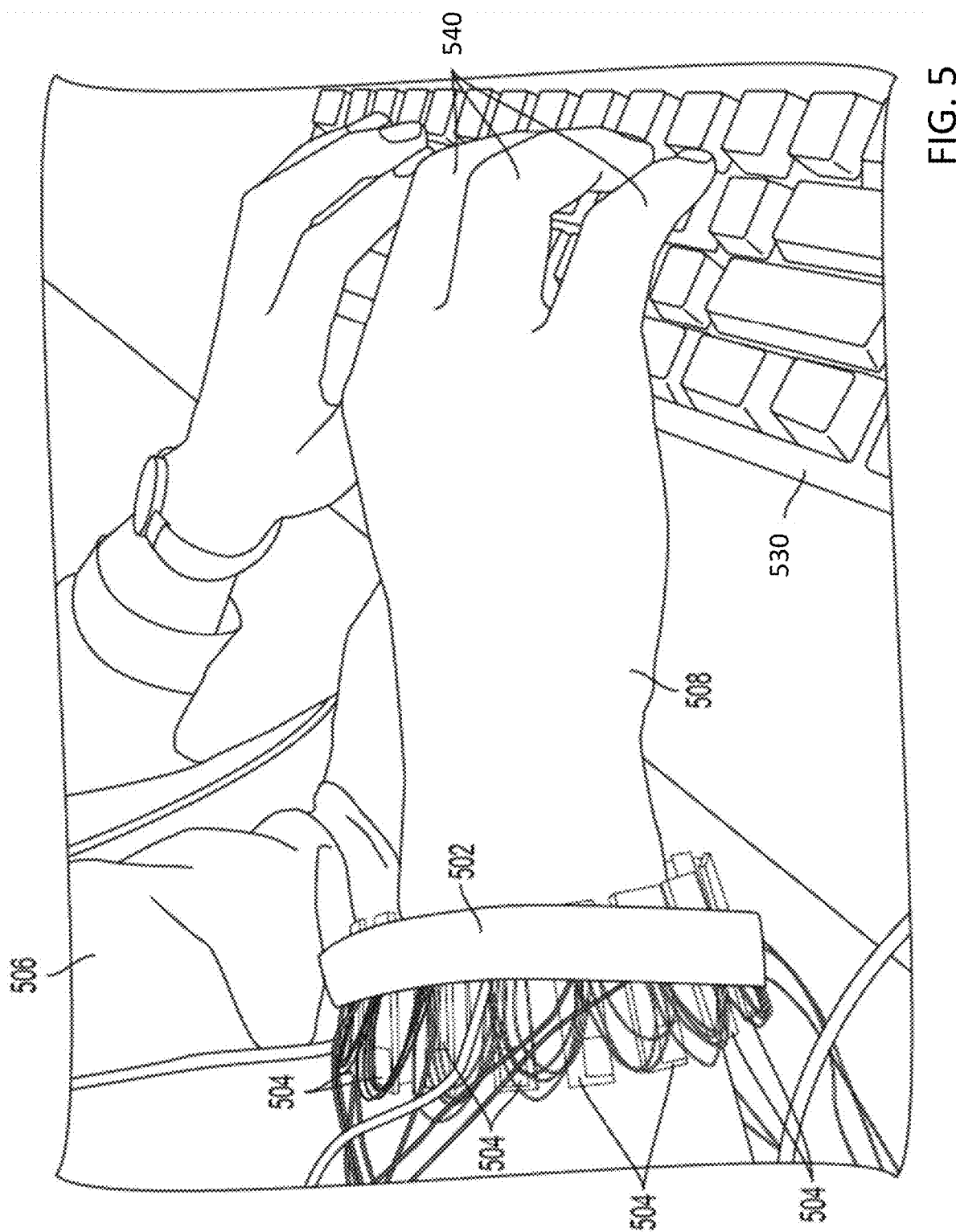
FIG. 5 illustrates a user wearing the wristband of FIG. 4 while typing on a keyboard in accordance with some embodiments of the technology described herein.

In one implementation, sixteen EMG sensors are arranged circumferentially around an elastic band configured to be worn around a user's lower arm. For example, FIG. 4 shows EMG sensors 504 arranged circumferentially around elastic band 502. It should be appreciated that any suitable number of neuromuscular sensors may be used and the number and arrangement of neuromuscular sensors used may depend on the particular application for which the wearable device is used. For example, a wearable armband or wristband may be used to generate control information for controlling a robot, controlling a vehicle, scrolling through text, controlling a virtual avatar, or any other suitable control task. For example, as shown in FIG. 5, a user 506 may be wearing elastic band 502 on hand 508. In this way, EMG sensors 504 may be configured to record EMG signals as a user controls keyboard 530 using fingers 540. In some embodiments, elastic band 502 may also include one or more IMUs (not shown), configured to record movement information, as discussed above.

Figure 6A:
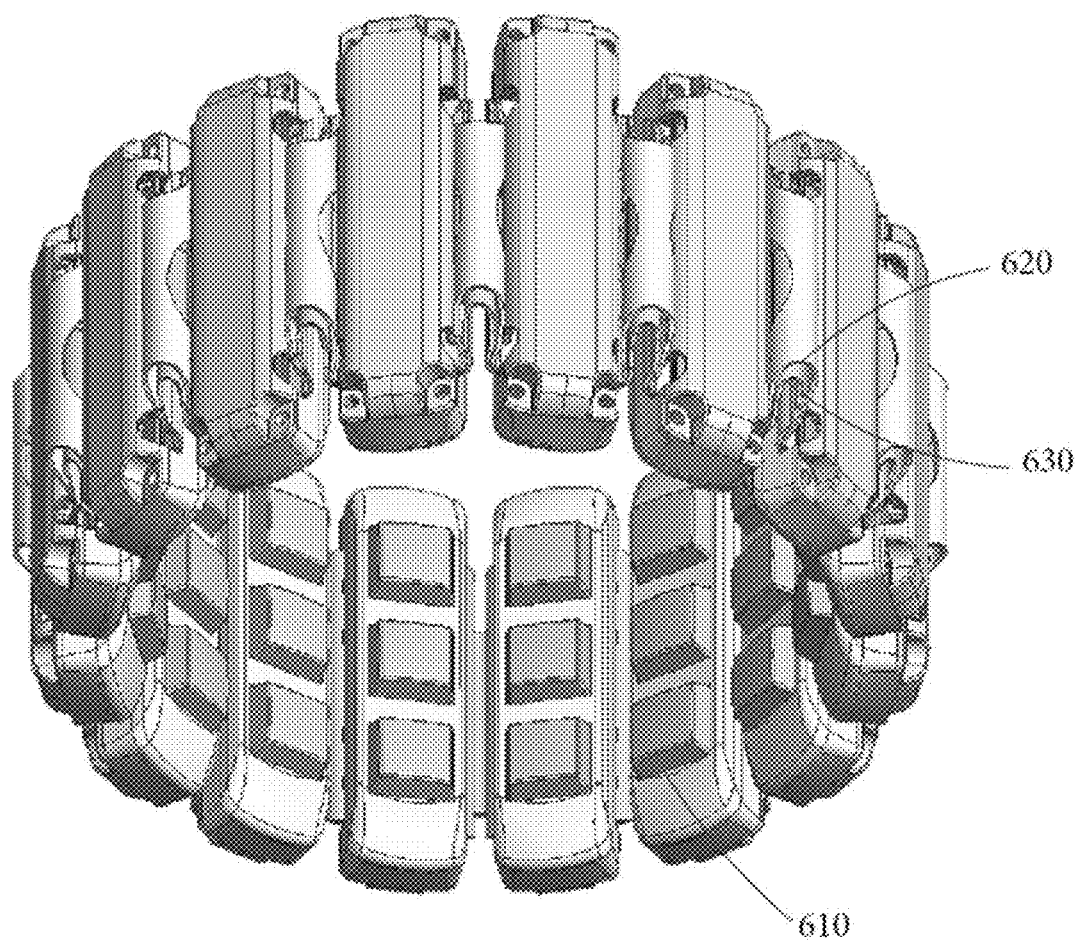
FIG. 6A illustrates a wearable system with sixteen EMG sensors arranged circumferentially around a band configured to be worn around a user's lower arm or wrist, in accordance with some embodiments of the technology described herein.

FIGS. 6A-6B and 7A-7B show other embodiments of a wearable system of the present technology. In particular, FIG. 6A illustrates a wearable system with a plurality of sensors 610 arranged circumferentially around an elastic band 620 structured to be worn around a user's lower arm or wrist. The sensors 610 may be neuromuscular sensors (e.g., EMG sensors). As shown, there may be sixteen sensors 610 arranged circumferentially around the elastic band 620 at a regular spacing. It should be appreciated that any suitable number of sensors 610 may be used, and the spacing need not be regular. The number and arrangement of the sensors 610 may depend on the particular application for which the wearable system is used. For instance, the number and arrangement of the sensors 610 may differ when the wearable system is to be worn on a wrist in comparison with a thigh. A wearable system (e.g., armband, wristband, thighband, etc.) can be used to generate control information for controlling an XR system, controlling a robot, controlling a vehicle, scrolling through text, controlling a virtual avatar, and/or performing any other suitable control task.

Figure 6B:
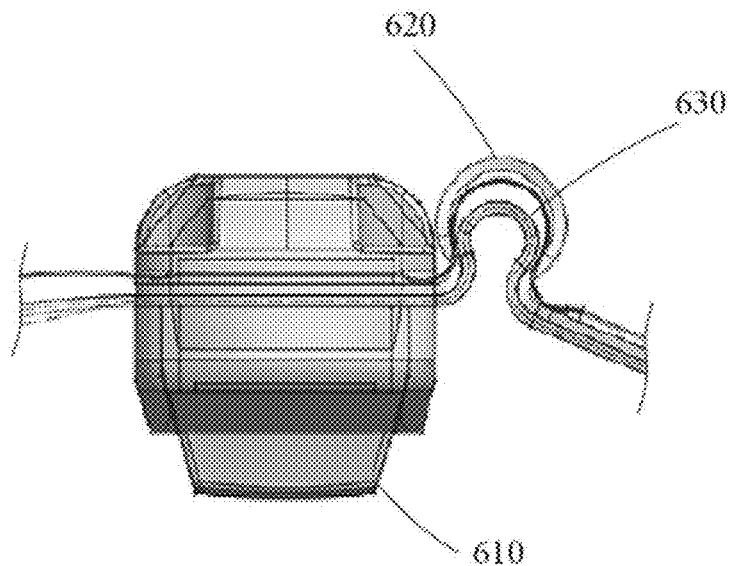
FIG. 6B is a cross-sectional view through one of the sixteen EMG sensors illustrated in FIG. 6A.

In some embodiments, the sensors 610 may include only a set of neuromuscular sensors (e.g., EMG sensors). In other embodiments, the sensors 610 may include a set of neuromuscular sensors and at least one auxiliary device. The auxiliary device(s) may be configured to continuously sense and record one or a plurality of auxiliary signal(s). Examples of auxiliary devices include, but are not limited to, IMUs, microphones, imaging devices (e.g., cameras), radiation-based sensors for use with a radiation-generation device (e.g., a laser-scanning device), heart-rate monitors, and other types of devices, which may capture a user's condition or other characteristics of the user. As shown in FIG. 6A, the sensors 610 may be coupled together using flexible electronics 630 incorporated into the wearable system. FIG. 6B illustrates a cross-sectional view through one of the sensors 610 of the wearable system shown in FIG. 6A.

In some embodiments, the output(s) of one or more of sensing component(s) of the sensors 610 can be optionally processed using hardware signal-processing circuitry (e.g., to perform amplification, filtering, and/or rectification). In other embodiments, at least some signal processing of the output(s) of the sensing component(s) can be performed using software. Thus, signal processing of signals sampled by the sensors 610 can be performed by hardware or by software, or by any suitable combination of hardware and software, as aspects of the technology described herein are not limited in this respect. A non-limiting example of a signal-processing procedure used to process recorded data from the sensors 610 is discussed in more detail below in connection with FIGS. 7A and 7B.

FIGS. 7A and 7B illustrate a schematic diagram with internal components of a wearable system with sixteen sensors (e.g., EMG sensors), in accordance with some embodiments of the technology described herein. As shown, the wearable system includes a wearable portion 710 (FIG. 7A) and a dongle portion 720 (FIG. 7B). Although not illustrated, the dongle portion 720 is in communication with the wearable portion 710 (e.g., via Bluetooth or another suitable short range wireless communication technology). As shown in FIG. 7A, the wearable portion 710 includes the sensors 610, examples of which are described above in connection with FIGS. 6A and 6B. The sensors 610 provide output (e.g., signals) to an analog front end 730, which performs analog processing (e.g., noise reduction, filtering, etc.) on the signals. Processed analog signals produced by the analog front end 730 are then provided to an analog-to-digital converter 732, which converts the processed analog signals to digital signals that can be processed by one or more computer processors. An example of a computer processor that may be used in accordance with some embodiments is a microcontroller (MCU) 734. As shown in FIG. 7A, the MCU 734 may also receive inputs from other sensors (e.g., an IMU 740) and from a power and battery module 742. As will be appreciated, the MCU 734 may receive data from other devices not specifically shown. A processing output by the MCU 734 may be provided to an antenna 750 for transmission to the dongle portion 720, shown in FIG. 7B.

The dongle portion 720 includes an antenna 752 that communicates with the antenna 750 of the wearable portion 710. Communication between the antennas 750 and 752 may occur using any suitable wireless technology and protocol, non-limiting examples of which include radiofrequency signaling and Bluetooth. As shown, the signals received by the antenna 752 of the dongle portion 720 may be provided to a host computer for further processing, for display, and/or for effecting control of a particular physical or virtual object or objects (e.g., to perform a control operation in an AR or VR environment)

Although the examples provided with reference to FIGS. 6A, 6B, 7A, and 7B are discussed in the context of interfaces with EMG sensors, it is to be understood that the wearable systems described herein can also be implemented with other types of sensors, including, but not limited to, mechanomyography (MMG) sensors, sonomyography (SMG) sensors, and electrical impedance tomography (EIT) sensors.

In some embodiments, multiple wearable devices, each having one or more IMUs and/or neuromuscular sensors included thereon may be used to generate selection and/or control information based on neuromuscular and/or motor unit activation associated with sub-muscular structures and/or movement(s) that involve one or more parts of the body.

In some embodiments, the recorded sensor data may be optionally processed to compute additional derived measurements. For example, recorded signals from an IMU sensor may be processed to derive an orientation signal that specifies the orientation of a body segment over time. Sensors may implement signal processing using components integrated with the sensing components, or at least a portion of the signal processing may be performed by one or more components in communication with, but not directly integrated with the sensing components of the sensors 110.

System 100 also includes one or more computer processors 112 programmed to communicate with sensors 110. For example, signals recorded or detected by one or more of the sensors may be provided to the processor(s) 112, which may be programmed to execute one or more machine learning algorithms that process signals output by the sensors 110 to train one or more inference models 114, and the trained (or retrained) inference model(s) 114 may be stored for later use in generating selection and/or control signals, as described in more detail below.

In some embodiments, inference model 114 may be implemented as a neural network and, for example, may be a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be a fully recurrent neural network, a gated recurrent neural network, a recursive neural network, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

In some embodiments, the inference model provides one or more discrete outputs. Discrete outputs (e.g., classification labels) may be used, for example, when a desired output is to know whether a particular pattern of activation (including individual neural spiking events) is detected in the neuromuscular signals. For example, the model may be trained to estimate whether the user is activating a particular motor unit, activating a particular motor unit with a particular timing, activating a particular motor unit with a particular firing pattern, or activating a particular combination of motor units. On a shorter timescale, discrete classification is used in some embodiments to estimate whether a particular motor unit fired an action potential within a given amount of time. In such a scenario, these estimates may then be accumulated to obtain an estimated firing rate for that motor unit.

In embodiments in which the inference model is implemented as a neural network configured to output a discrete signal, the neural network may include a softmax layer such that the outputs add up to one and may be interpreted as probabilities. The output of the softmax layer may be a set of values corresponding to a respective set of control signals, with each value indicating a probability that the user wants to perform a particular control action. As one non-limiting example, the output of the softmax layer may be a set of three probabilities (e.g., 0.92, 0.05, and 0.03) indicating the respective probabilities that the detected pattern of activity is one of three known patterns.

It should be appreciated that when the inference model is implemented as a neural network configured to output a discrete signal, the neural network is not required to produce outputs that add up to one. For example, instead of a softmax layer, the output layer of the neural network may be a sigmoid layer (which has no restriction that the probabilities add up to one). In such embodiments, the neural network may be trained with a sigmoid cross-entropy cost. Such an implementation may be advantageous in the case when multiple different control actions may occur within a threshold amount of time and it is not important to distinguish the order in which these actions occur (e.g., a user may activate two patterns of neural activity within the threshold amount of time). In some embodiments, any other suitable non-probabilistic multi-class classifier may be used, as aspects of the technology described herein are not limited in this respect.

In some embodiments, the output of the inference model(s) may be continuous signal(s) rather than discrete signal(s). For example, the model may output an estimate of the firing rate of each motor unit or the model may output a time-series electrical signal corresponding to each motor unit or sub-muscular structure.

It should be appreciated that aspects of the technology described herein are not limited to using neural networks, as other types of inference models may be employed in some embodiments. For example, in some embodiments, the inference model may comprise a hidden Markov model (HMM), a switching HMM with the switching allowing for toggling among different dynamic systems, dynamic Bayesian networks, and/or any other suitable graphical model having a temporal component. Any such inference model may be trained using recorded sensor signals.

As another example, in some embodiments, the inference model is a classifier taking as input, features derived from the recorded sensor signals. In such embodiments, the classifier may be trained using features extracted from the sensor data. The classifier may be a support vector machine, a Gaussian mixture model, a regression based classifier, a decision tree classifier, a Bayesian classifier, and/or any other suitable classifier, as aspects of the technology described herein are not limited in this respect. Input features to be provided to the classifier may be derived from the sensor data in any suitable way. For example, the sensor data may be analyzed as time series data using wavelet analysis techniques (e.g., continuous wavelet transform, discrete-time wavelet transform, etc.), Fourier-analytic techniques (e.g., short-time Fourier transform, Fourier transform, etc.), and/or any other suitable type of time-frequency analysis technique. As one non-limiting example, the sensor data may be transformed using a wavelet transform and the resulting wavelet coefficients may be provided as inputs to the classifier.

In some embodiments, values for parameters of the inference model(s) may be estimated from training data. For example, when the inference model is implemented as a neural network, parameters of the neural network (e.g., weights) may be estimated from the training data. In some embodiments, parameters of the inference model(s) may be estimated using gradient descent, stochastic gradient descent, and/or any other suitable iterative optimization technique. In embodiments where the inference model is implemented as a recurrent neural network (e.g., an LSTM), the inference model may be trained using stochastic gradient descent and backpropagation through time. The training may employ a cross-entropy loss function and/or any other suitable loss function, as aspects of the technology described herein are not limited in this respect.

System 100 also includes one or more controllers 116. For example, controller 116 may be a display controller configured to display a visual representation (e.g., of a hand) on a display. As discussed in more detail below, one or more computer processors may implement one or more trained inference models that receive as input sensor signals and provide as output information that is used to generate control signals to, for example, select and control objects in the user's environment.

Some embodiments are directed to using one or more inference models, at least in part, to map neuromuscular signals and/or information derived from the neuromuscular signals to selection and/or control signals. Per various embodiments, the inference model(s) may receive as input IMU signals, neuromuscular signals (e.g., EMG, MMG, and SMG signals), information (e.g., spike train data) extracted from neuromuscular signals, external device or auxiliary device signals (e.g., camera or laser-scanning signals), or any combination of the foregoing as a user performs one or more muscular or sub-muscular activations. The inference model(s) may be used to predict the selection and/or control information without the user having to make perceptible movements.

System 100 also optionally includes a user interface 118. Feedback determined based on the signals recorded and/or detected by sensors 110 and processed by processor(s) 112 may be provided via user interface 118 to facilitate a user's understanding of how the system is interpreting the user's intention. User interface 118 may be implemented in any suitable way including, but not limited to, an audio interface, a video interface, a tactile interface, an electrical stimulation interface, or any combination of the foregoing.

The architecture of system 100 may take any suitable form. Some embodiments employ a thin architecture in which the processor(s) 112 are included as a portion (or portions) of a device (or devices) that are separate from and in communication with the plurality of neuromuscular sensors 110 arranged on the one or more wearable devices. The neuromuscular sensors may be configured to wireless stream in substantially real-time, the plurality of neuromuscular signals and/or the information derived from the plurality of neuromuscular signals to processor(s) 112 for processing including, but not limited to, selection and control of objects in the user's environment. The device(s) separate from and in communication with the plurality of neuromuscular sensors may be, for example, a remote server, a desktop computer, a laptop computer, a smartphone, a wearable electronic device such as a smartwatch, a health monitoring device, smart glasses, or an augmented reality system.

Some embodiments employ a thick architecture in which the processor(s) 112 are integrated with the one or more wearable devices on which the neuromuscular sensors 110 are arranged. In yet further embodiments, the processing of neuromuscular signals is divided between multiple processors, at least one of which is integrated with sensors 110 and at least one of which is included as a portion of a device separate from and in communication with the sensors 110. In such an implementation, the neuromuscular sensors may be configured to transmit at least some of the recorded neuromuscular signals to a first computer processor remotely located from the sensors. The first computer processor may be programmed to train, based on the transmitted neuromuscular signals, at least one inference model. The first computer processor may then be programmed to transmit the trained at least one inference model to a second computer processor integrated with the one or more wearable devices on which the sensors are arranged. The second computer processor may be programmed to select and/or control objects in the user's environment using the at least one trained inference model transmitted from the first computer processor. In this way, the training/fitting process and the real-time process of using the trained model(s) may be separated by being performed by different processors.

In some embodiments, a computer application may be configured to simulate an extended reality, cross reality or XR environment (e.g., virtual reality (VR) or augmented reality (AR) environment) and may be instructed to display a visual character such as an avatar (e.g., via controller 116). Positioning, movement, and/or forces applied by portions of visual character within the virtual extended reality environment may be displayed based on the output of the one or more trained inference models. The visual representation may be dynamically updated as continuous signals are recorded by the sensors 110 and processed by the trained inference model(s) 104 to provide a computer-generated representation of the character's movement that is updated in real-time.

Information generated in either system (AR camera inputs, sensor inputs) can be used to improve the user experience, accuracy, feedback, inference models, calibration functions, and other aspects of the overall system. To this end, in an AR environment for example, system 100 may include an AR system that includes one or more processors, a camera, and a display (e.g., via AR glasses or other viewing device) that provides AR information within a view of the user. System 100 may also include system elements that couple the AR system with a computer-based system that generates a musculoskeletal representation based on sensor data. For example, the systems may be coupled via a special-purpose or other type of computer system that receives inputs from the AR system that generates a computer-based musculoskeletal representation. Such a system may include a gaming system, robotic control system, personal computer, or other system that is capable of interpreting AR and musculoskeletal information. The AR system and the system that generates the computer-based musculoskeletal representation may also be programmed to communicate directly or indirectly. Such information may be communicated using any number of interfaces, protocols, or media.

As discussed above, some embodiments are directed to using one or more inference models for predicting musculoskeletal information based on signals recorded from wearable sensors. As discussed briefly above in the example where portions of the human musculoskeletal system can be modeled as a multi-segment articulated rigid body system, the types of joints between segments in a multi-segment articulated rigid body model constrain movement of the rigid body. Additionally, different individuals tend to move in characteristic ways when performing a task that can be captured in statistical patterns of individual user behavior. At least some of these constraints on human body movement may be explicitly incorporated into inference model(s) used for prediction in accordance with some embodiments. Additionally or alternatively, the constraints may be learned by the inference model(s) though training based on recorded or detected sensor data, as discussed briefly above.

Some embodiments are directed to using one or more inference models for predicting information to enable the generation and/or real-time update of a computer-based musculoskeletal representation. The inference model(s) may be used to predict the information and maintain a current state of the musculoskeletal representation based on IMU signals, neuromuscular signals (e.g., EMG, MMG, and SMG signals), auxiliary or external device signals (e.g., camera or laser-scanning signals), any signals detected from a user as they perform one or more muscle contractions or movements, or any combination of the foregoing. For instance, as discussed above, a camera associated with an AR system may be used to capture actual position data relating to the computer-based musculoskeletal representation and such actual position information may be used to improve the accuracy of the representation. Further, outputs of the inference model(s) may be used to generate a visual representation of the computer-based musculoskeletal representation in an AR/VR environment. For example, a visual representation of muscle groups firing, force being applied, text being entered via movement, or other information produced by the computer-based musculoskeletal representation may be rendered in a visual display of an AR system.

In some embodiments, other input/output devices (e.g., auditory inputs/outputs, haptic devices, etc.) may be used to further improve the accuracy of the overall system and/or user experience.

Figure 2:
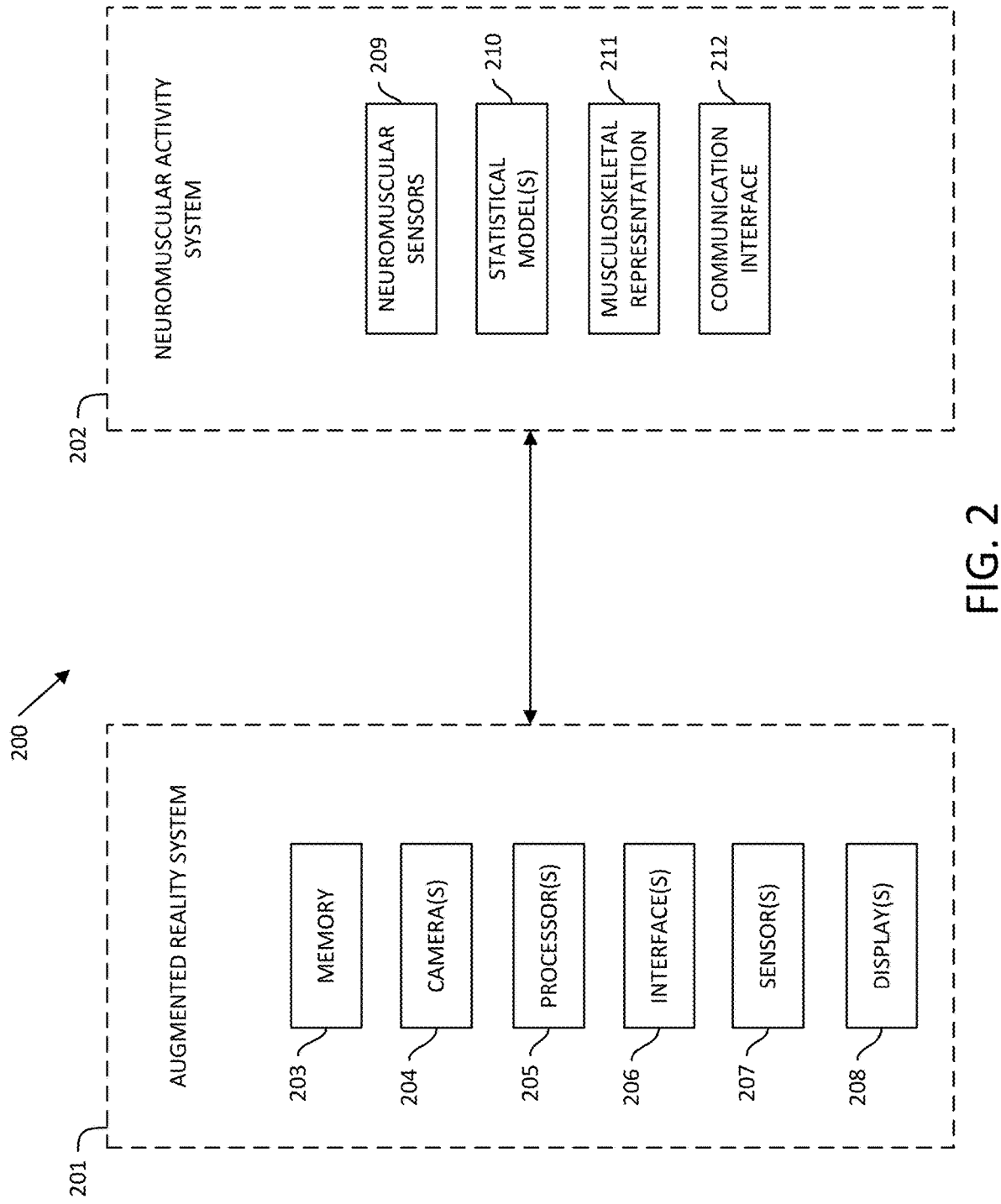
FIG. 2 is a schematic diagram of a computer-based system that integrates an augmented reality (AR) system with a neuromuscular activity system in accordance with some embodiments of the technology described herein.

FIG. 2 illustrates a schematic diagram of an exemplary embodiment wherein a distributed computer-based system 200 integrates an augmented reality (AR) system 201 with a neuromuscular activity system 202. Neuromuscular activity system 202 is similar to exemplary system 100 described above with respect to FIG. 1.

Generally, an X Reality or Cross Reality system, such as an augmented reality (AR) system 201 may take the form of a pair of goggles, glasses, head mounted display, or other type of device that shows display elements to the user that may be superimposed on "reality" which in some cases could be a user's view of the environment (e.g., as viewed through the user's eyes), or a captured (e.g., by cameras, for example) version of a user's view of the environment. In some embodiments, AR system 201 may include one or more cameras (e.g., camera(s) 204) mounted within a device worn by a user that captures one or more views experienced by the user in their environment. System 201 may have one or more processors 205 operating within the user device and/or within a peripheral device or computer system, and such processor(s) may be capable of transmitting and receiving video information and other types of sensor data.

AR system 201 may also include one or more sensors 207 such as microphones, GPS elements, accelerometers, infrared detectors, haptic feedback elements or any other type of sensor. In some embodiments, the AR system 201 may be an audio-based or auditory AR system and the one or more sensors 207 may also include one or more headphones or speakers. Further, AR system 201 may also have one or more displays 208 that permit the AR system to overlay and/or display information to the user in addition to the view of the user's environment presented by the AR system. AR system 201 may also include one or more communication interfaces (e.g. interfaces 206) for the purpose of communicating information to one or more computer systems (e.g., a gaming system or other systems capable of rendering or receiving AR data). AR systems can take many forms and are provided by a number of different manufacturers. For example, various embodiments may be implemented in association with one or more types of AR systems. For example various embodiments may be implemented with the HoloLens holographic reality glasses available from the Microsoft Corporation, the Lightwear AR headset from Magic Leap, the Google Glass AR glasses available from Alphabet, the R-7 Smartglasses System available from ODG, or any other type of AR and/or VR device. Although discussed by way of example, it should be appreciated that one or more embodiments may be implemented within VR systems.

AR system 201 may be operatively coupled to the neuromuscular activity system 202 through one or more communication methods, including but not limited to, the Bluetooth protocol, Wi-Fi, Ethernet-like protocols, or any number of connection types. It should be appreciated that, for example, systems 201 and 202 may be directly connected or coupled through one or more intermediate computer systems or network elements.

Neuromuscular activity system 202 may be similar in structure and function to exemplary system 100 described above with reference to FIG. 1. In particular, system 202 may include one or more neuromuscular sensors 209, one or more inference models 210, and may create, maintain, and store a musculoskeletal representation 211. Per an exemplary embodiment discussed above, system 202 may include a device such as a band that can be worn by a user in order to collect and analyze neuromuscular signals. Further, system 202 may include one or more communication interfaces 212 that permit system 202 to communicate with AR system 201, such as by Bluetooth, Wi-Fi, or other communication method. Notably, AR system 201 and neuromuscular activity system 202 may communicate information which can be used to enhance the user experience and/or allow the AR system to function more accurately and effectively.

Although FIG. 2 describes a distributed computer-based system that integrates the AR system 201 with the neuromuscular activity system 202, it will be understood the integration may be non-distributed in nature. In some embodiments, the neuromuscular activity system 202 may be integrated into the AR system 201 such that the various components of the neuromuscular activity system 202 may be considered as part of the AR system. For example, neuromuscular signals recorded by the neuromuscular sensors 209 may be treated as any other input (e.g., input from camera(s) 204, sensors 207) to the AR system 201. In addition, the processing of the sensor signals obtained from neuromuscular sensors 209 may be integrated into the AR system 201.

Figure 3:
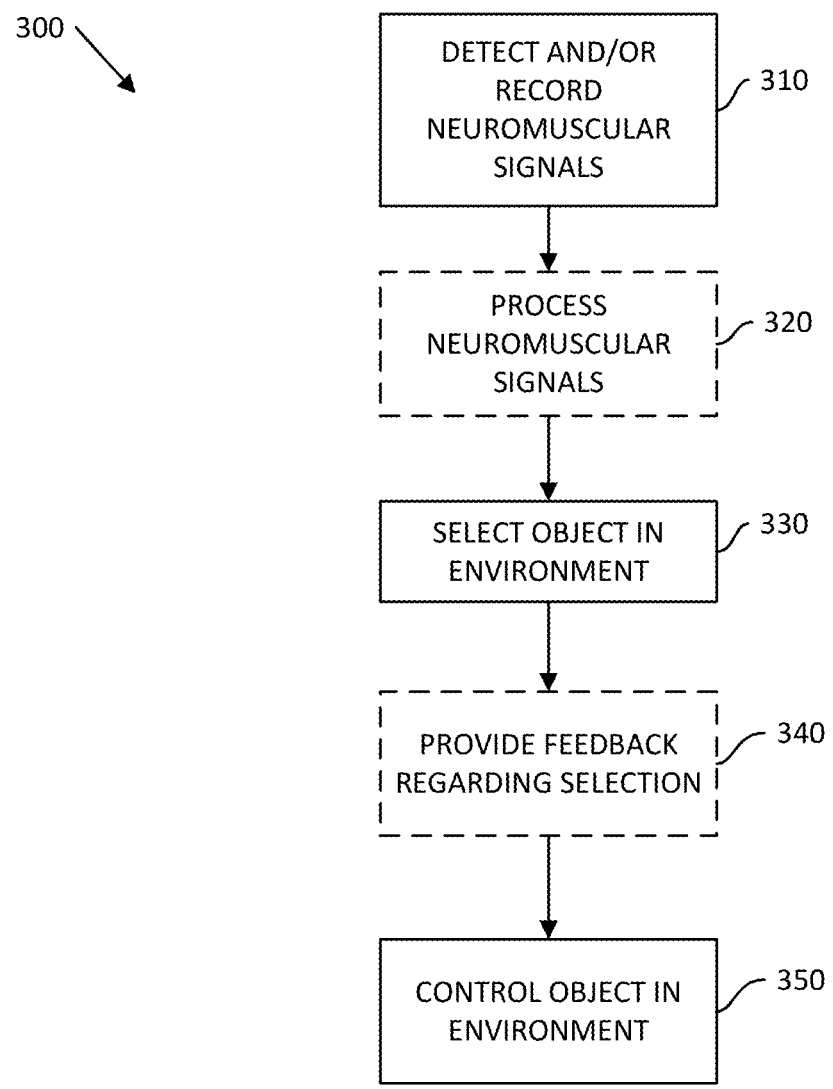
FIG. 3 is a flowchart of a process for selecting and controlling objects in an environment using neuromuscular signals in accordance with some embodiments of the technology described herein.

FIG. 3 illustrates a process 300 for controlling an operation of an object in an environment of the user in accordance with some embodiments (including an XR environment). In act 310, a plurality of neuromuscular signals are detected and/or recorded by a plurality of neuromuscular sensors arranged on one or more wearable devices worn by a user as the user activates one or more motor units. Process 300 then proceeds to act 320 where the recorded neuromuscular signals are optionally processed. For example, the recorded neuromuscular signals may be filtered, amplified, or otherwise processed prior to being used to select and/or control an object in an environment of the user.

Process 300 then proceeds to act 330, where the physical object within the environment of the user is selected for control. In some embodiments, selection of the object is performed based, at least in part, on information provided by the user. The user may directly interact with the object (e.g., by touching one or more portions of the object) to select the object. Alternatively, the user may select the object without touching the object by, for example, using a voice instruction, or providing some other type of input to select the object without the need to physically touch the object. In other embodiments, selection of the object may be performed based, at least in part, on the recorded and/or detected neuromuscular signals or information derived from the recorded and/or detected neuromuscular signals. For example, an object may be selected based on a gesture or pose determined based, at least in part, on the neuromuscular signals (e.g., using an inference model), as described herein.

In some embodiments, selection of the object may be automatically performed (e.g., without user input), and the selection may be based in part or wholly on information from one or more sensors (e.g., cameras or eye tracking devices configured to track where the user is looking within the environment). In yet further embodiments, selection of the object may be performed based in part on automated techniques (e.g., a camera may identify multiple objects in the camera's field of view) and based in part on user-provided information (e.g., user selection of one of the identified multiple objects in the camera's field of view based at least in part on detected and/or recorded neuromuscular signals).

In some embodiments, selection of the object may be performed based, at least in part, on user context and/or user behavior. For example, selection of the object may be based, at least in part, on user behavior such as information about one or more recent interactions between the user and one or more objects. For example, if the user had most recently controlled a particular device such as a smart speaker by pressing play on a new track, then the smart speaker may be automatically selected, and a muscular activation determined based, at least in part, on the detected and/or recorded neuromuscular signals may be used to change the volume of the selected smart speaker. In another example, selection of the object may be based, at least in part, on user context such as information a current location of the user (e.g., which environment (e.g., room) the user is currently located). The information about the user's current location may be determined in any suitable way including, but not limited to, using NFC, another near-field technology, and a global positioning system (GPS). Based, at least in part, on the location information, a physical object in the user's environment (e.g., a light switch in a particular room) may be selected for control.

In embodiments in which selection of the object is performed based, at least in part, on the recorded and/or detected neuromuscular signals and/or information derived from the recorded and/or detected neuromuscular signals, the system may store information describing an association between the neuromuscular signals and/or information derived from the neuromuscular signals and one or more physical objects capable of selection by the user. This association information may be stored either locally in the system 100 or remotely in a connected system that is either directly or indirectly connected with system 100. For example, mappings between detected and/or recorded neuromuscular signals and one or more physical objects capable of selection by the user within the environment may be represented by one or more stored trained statistical or inferential models. The one or more inference models may be trained to provide as output a recognized gesture associated with selection of a particular object. For example, a recognized "thumbs up" gesture may be associated with selection of a lamp in the environment, whereas a recognized "closed fist" gesture may be associated with selection of a thermostat in the environment. Such devices can be connected within the environment as described herein (e.g., by Wi-Fi, Bluetooth, etc.) Alternatively, recognition of one or more gestures in some embodiments may be associated with a musculoskeletal representation of a portion or portions of the user's body (e.g., the user's hand or hands), and the output(s) of the one or more trained inferential models may be information that updates the musculoskeletal representation. In some embodiments, the recorded and/or detected neuromuscular signals may be mapped directly to the selection of one or more physical objects in the user's environment without the use of recognized gestures or musculoskeletal representations. As an example, the one or more trained inference models may include a plurality of trained inference models, each of which is trained to predict whether the recorded neuromuscular signals are associated with a selection of a particular physical object in the user's environment.

In some embodiments, selection of an object in the user's environment may be performed using techniques that do not rely on an interpretation of the recorded and/or detected neuromuscular signals, or that rely on and require signals in addition to the recorded and/or detected neuromuscular signals. For example, in some embodiments, a physical object in the user's environment may be selected, at least in part, using wireless communication between a communication device associated with the user (e.g., the user's smartphone or a communication device integrated with the neuromuscular activity device) and a communication device associated with the object to be selected. For example, near field communication (NFC) may be established between an NFC device associated with the user (e.g., located within the user's smartphone, integrated with a wearable device worn by the user) and an NFC device associated with the object when the user is in close proximity to the object, resulting in selection of the object. In some embodiments, the NFC device can be implemented as a component in the embodiments shown in FIGS. 4-7, and the NFC device can communicate using radiofrequency identification ("RFID"). In other embodiments, a line-of-sight wireless communication technique such as infrared (IR) communication may be used to select an object. In such embodiments, IR communication between an IR communication device worn by the user (e.g., integrated with a wearable device on which the neuromuscular sensors are arranged, including the exemplary embodiments shown in FIGS. 4-7) may be configured to emit an IR pattern which is read by an IR sensor located on the object to be selected. Alternatively, the object may emit an IR pattern which is read by an IR sensor associated with the user to uniquely identify the object to be controlled.

In some embodiments, when selection of an object is desired, a broadcast signal may be transmitted to one or more objects in the user's environment to instruct the objects to begin emitting IR patterns so as not to require emission of the IR patterns at all times. Such a broadcast signal can be initiated and detected by the system in various ways, including by detecting the user's neuromuscular activity and turning on the broadcast signal in response to certain user neuromuscular activity. Alternatively, for one or both of the embodiments discussed above, the system disclosed herein can select an object or objects within a user's environment based on a combination of detected neuromuscular signals or patterns, and signal(s) emanating from the one or more objects in the environment. For example, an IR sensor associated with an object to be controlled could be selected by the user only during certain times when the object is emitting specific IR patterns as defined by the system and the user is also simultaneously generating certain neuromuscular signals or patterns.

Figure 8A:
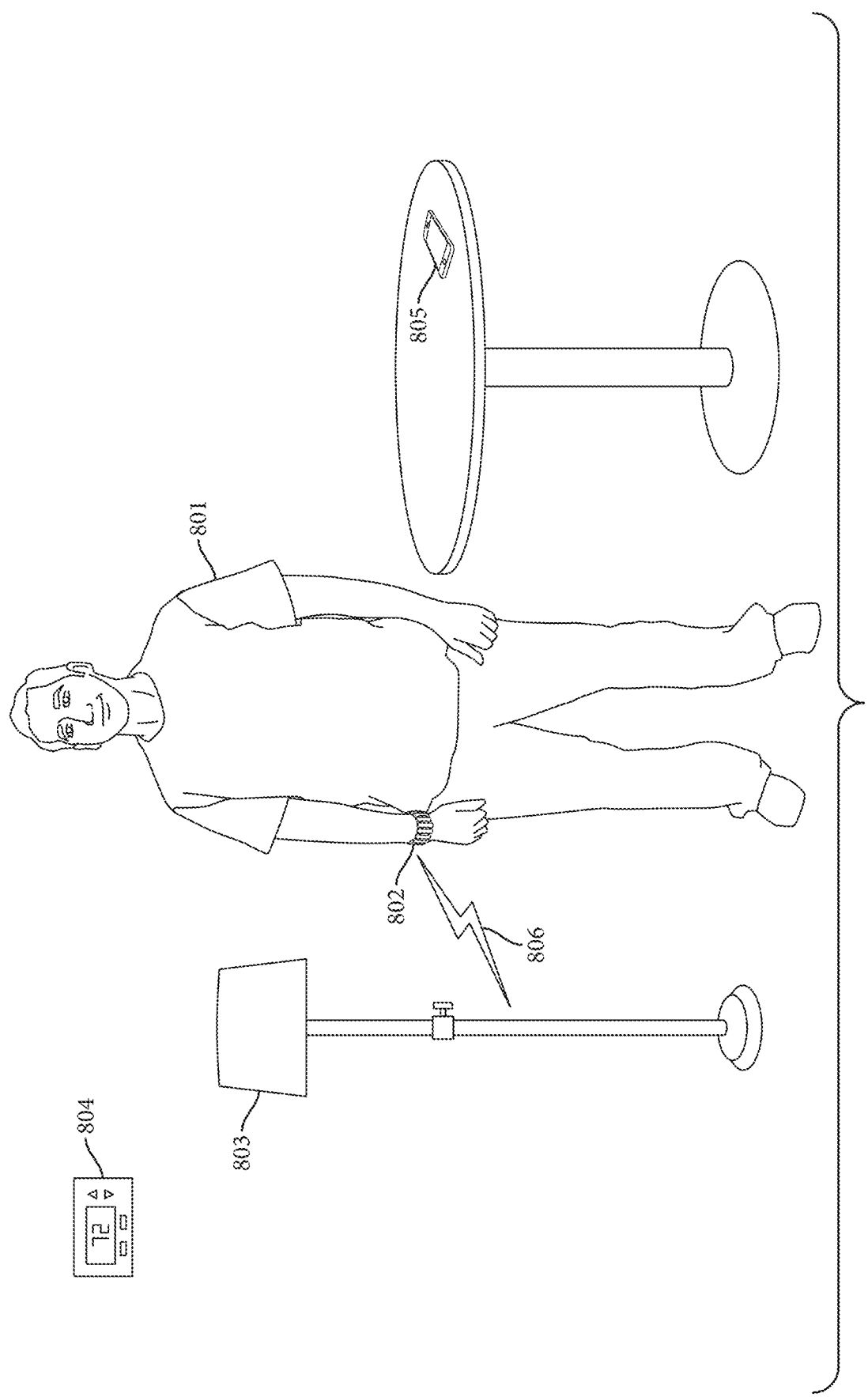
FIGS. 8A and 8B illustrate exemplary scenarios in which a physical object is automatically selected using a short range wireless technique in accordance with some embodiments.
Figure 8B:
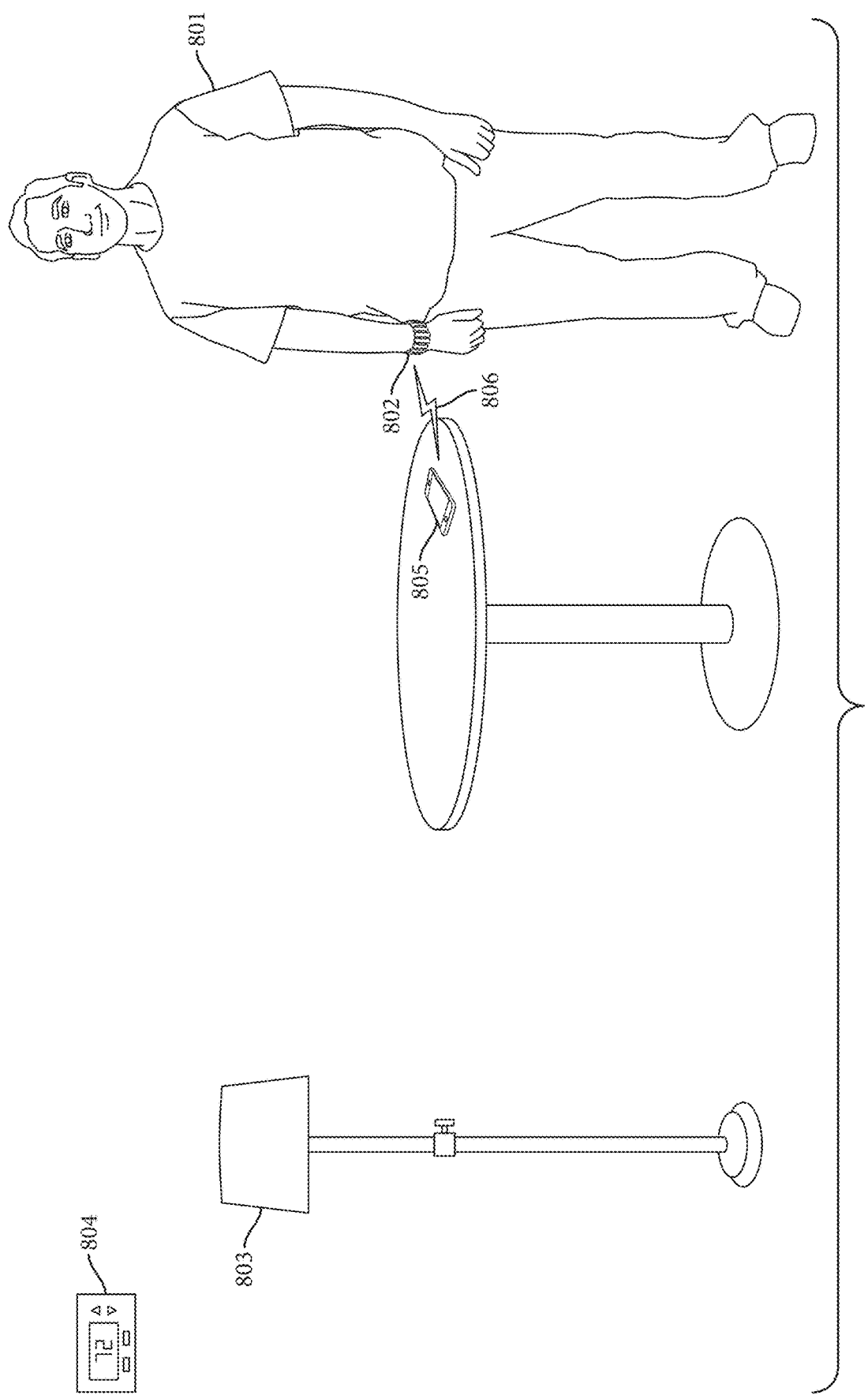

FIGS. 8A and 8B illustrate scenarios in which a physical object in the user's environment is automatically selected based, at least in part, on the user's proximity to the selectable physical object in accordance with some embodiments of the invention. As shown in FIG. 8A, user 801 wearing wearable device 802 (e.g., on the wrist) is located in a room that includes multiple selectable physical objects including smart lamp 803, smart thermostat 804, and smartphone 805. As the user moves throughout the room, the physical object that is automatically selected for control can change based on the proximity of the wearable device 802 relative to one or more of the selectable physical objects in the room. For example, FIG. 8A shows that the wearable device 802 worn by user 801 is in the closest proximity to the lamp 803 from among the three selectable physical objects shown in the room (i.e., the wearable device 802 is closer to the lamp 803 relative to the thermostat 804 and smartphone 805). In response to detecting that the lamp 803 is the closest selectable object (or is within a threshold distance, for example) to the wearable device 802, a wireless communication session 806 (e.g., a near-field communication connection, such as NFC, Bluetooth, infrared (IR), etc.) may be established such that control commands generated by the wearable device (e.g., in response to the user performing muscular activations, examples of which are described herein) may be used to control an operation of the selected object via the wireless communication session 806.

FIG. 8B illustrates a scenario similar to that shown in FIG. 8A, but in which the user 801 has moved in the room such that the wearable device 802 is located in closer proximity to the smartphone 805 resting on the table rather than the other selectable physical objects (i.e., the smart lamp 803 and the smart thermostat 804). In response to determining that the wearable device 802 is located closest to the smartphone 805 relative to the other selectable physical objects, a communication session 806 may be established between the wearable device 802 and the smartphone 805 to enable the user 801 to control one or more operations of the smartphone 805 using muscular activations as described herein. In some embodiments feedback may be provided to inform the user about which of the selectable physical objects in the environment is currently selected.

In some embodiments that employ wireless communication techniques for object selection, one or more security techniques may be implemented prior to selection of the physical object to ensure that the user is authorized to select the object for control. The one or more security techniques may require the user to authenticate their identity using, for example, a fingerprint or retinal scanner or using voice authentication. In some embodiments, user authentication is performed, at least in part, based on an analysis of the neuromuscular signals recorded and/or detected by the plurality of neuromuscular sensors. In such embodiments, the system may store one or more user authentication templates for identifying particular users, and the recorded and/or detected neuromuscular signals may be compared to the stored user authentication templates to identify the user.

Access control and authentication for connected devices are sub-optimal in at least some instances, particularly in environments in which a connected device is accessed by many users (e.g., a speaker or door lock in a connected home). Per various embodiments described herein, access control and authentication of a user of a connected device may be achieved by detecting a unique neuromuscular signal for a user (e.g., as recorded by an armband or wristband array of neuromuscular sensors as described herein). A connected device enabled for authentication and/or access control via neuromuscular signals may automatically recognize a user in proximity to the connected device based on the unique pattern of neuromuscular signals, permitting that user to access and control the connected device and/or for a personalized user profile of the connected device to be activated. For example, a user wearing an apparatus with an array of neuromuscular sensors as described herein may enter a room with a connected light configured for neuromuscular authentication and thereby cause the connected light to, for example, load a particular color palette or light level personalized for that user.

Figure 9:
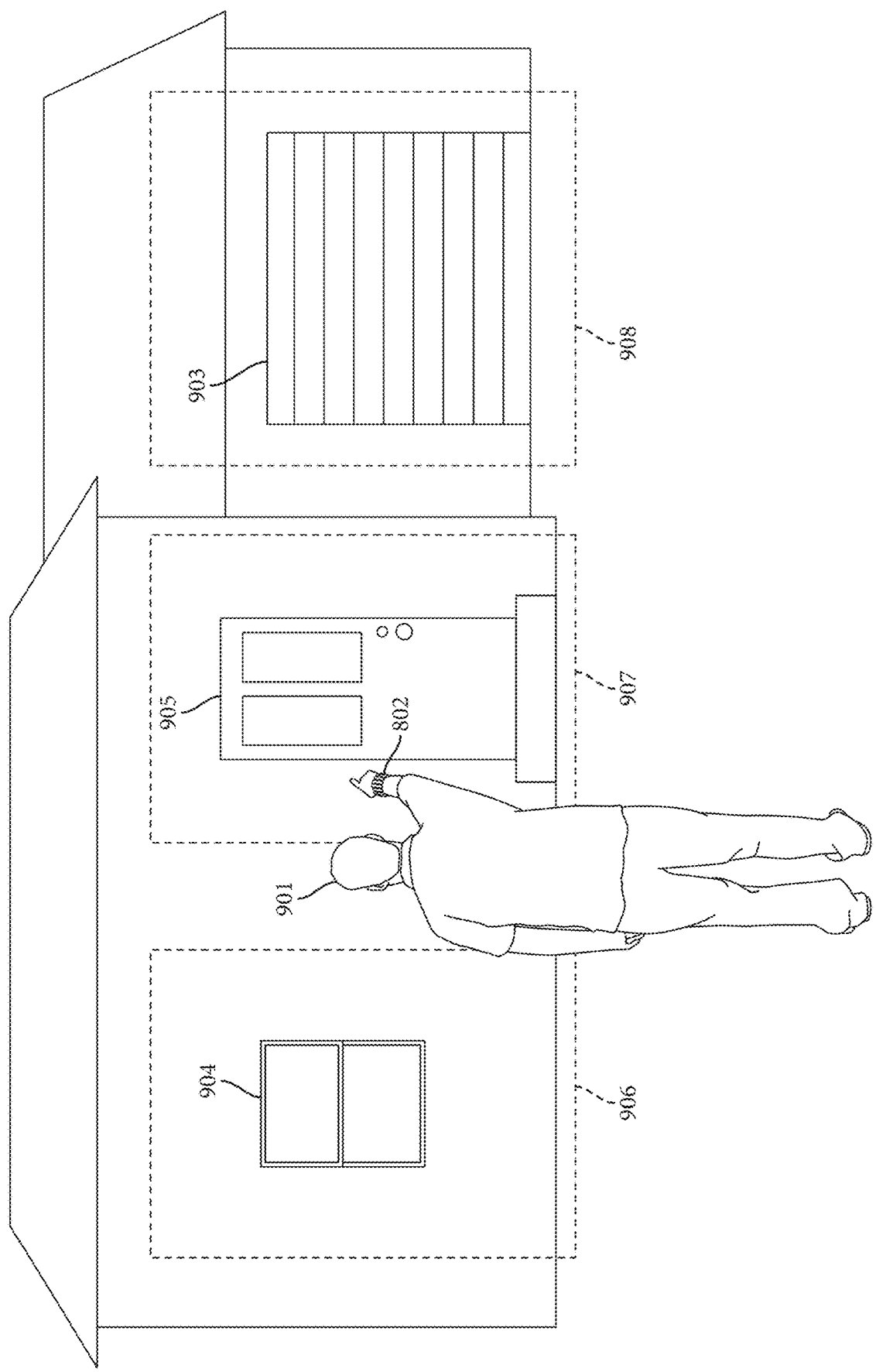
FIG. 9 illustrates a scenario in which a user may select and/or control a physical object located in a particular spatial zone in accordance with some embodiments.

In some embodiments, selection of a physical object in the user's environment to be controlled is performed by dividing the user's environment into different spatial regions, where objects capable of selection are arranged in the different spatial regions of the user's environment. FIG. 9 illustrates a scenario in which the user's environment is divided into spatial regions, areas, or zones that include selectable physical objects therein. As shown, a user 901 wearing wearable device 802 (e.g., on the wrist) is standing in front of a house that has multiple selectable physical objects within view of the user. A first spatial area 906 includes a window 904 having, for example, a smart window shade. A second spatial area 907 includes a door 905 having attached thereto, a smart keylock or keypad. A third spatial area 908 includes a garage door 903 having attached thereto a smart garage door opener. The user may point to one of the three spatial areas (e.g., area 906, 907, 908) to indicate which of the corresponding objects (e.g., the front door smart keylock or keypad, the smart window shade, the smart garage door opener) the user wants to control. In the example shown in FIG. 9, the user is pointing to the second spatial area 907, and accordingly, the door 905 having a smart lock or keypad attached thereto, is selected for control. The determination of which region the user is pointing to may be determined in any suitable way. For example, signals recorded from an IMU sensor arranged on the user's body (e.g., integrated with one or more neuromuscular sensors on wearable device 802) may be used to determine which direction the user is pointing. In another example, one or more cameras or other external devices (not shown), either arranged within the environment (e.g., on a portion of the house) or arranged on wearable device worn by the user 901 may be used to determine the direction that the user is pointing to determine which of the objects in the user's environment the user intents to select.

In some embodiments, selection of an object in the user's environment to be controlled is performed, at least in part, using an augmented reality (AR) system worn by the user. For example, the AR system may include a camera or other sensing device (e.g., an eye-tracking device) configured to determine where the user is looking within the user's current field of view. An indication of the selectable physical objects within the user's field of view may be displayed within an augmented reality environment generated by the AR system to facilitate the user's selection of an object. The user may proceed to select an object by looking at the object within the AR environment, pointing to the object, selecting the object from a list of possible selected objects presented on a user interface of the AR system, or using any other suitable selection technique. For example, in one implementation, the AR system may be configured to display a cursor within the AR environment. User interactions with the neuromuscular activity system and/or the AR system may result in changes to the display position of the cursor within the AR environment, and selection of an object may be based, at least in part, on the display position of the cursor. In some embodiments, selection of an object identified within the AR environment may be selected based, at least in part, on the recorded and/or detected neuromuscular signals.

In some embodiments, selection of an object in the user's environment is performed, at least in part, using a simultaneous localization and mapping (SLAM) system. In such embodiments, at least a portion of the user's environment may be mapped using a mapping technique, such as LIDAR-based or camera-based mapping. A sensor (e.g., a camera/laser sensor) associated with the user may be used, based on where a user is pointing in the environment and environment mapping information, to determine where the user is located in the environment and what object the user is likely pointing at in the environment.

In some embodiments, a combination of the foregoing techniques are combined to enable selection of an object in the environment of the user. For example, in embodiments that include an AR system, a wireless communication system (e.g., IR communication) may be used to identify selectable and/or controllable (e.g., "smart") devices or objects within the user's environment, and the AR system may provide an indication within the AR environment displayed to the user about the objects the wireless communication system identified as being selectable/controllable. Subsequently, the user may select one of the indicated objects based, at least in part, on neuromuscular signals recorded and/or detected by the plurality of neuromuscular sensors worn by the user. Other combinations of the selection technologies described above are also contemplated and aspects of the disclosure are not limited in this respect.

Returning to process 300, after an object in the environment is selected, process 300 proceeds to act 340, where feedback is optionally provided to the user. Such feedback may provide the user with confirmation that an object has been selected prior to the user performing an action to control an operation of the selected object. In some embodiments, one or more of the objects to be controlled provides feedback upon selection. The selected object may include one or more indicators (e.g., a visible LED indicator, an audible speaker indicator) configured to provide the feedback when selected. The feedback provided by the selected object may be visual feedback, auditory feedback, vibratory feedback, or any combination of the foregoing. For example, a selected lamp may blink or glow upon selection or one or more LEDs integrated with a speaker may provide combined visual and auditory feedback upon selection of the speaker. Auditory feedback may be provided as a tone or voice feedback may be provided as an indication that an object has been selected. Selection of different objects in the user's environment can result in different types of selection feedback being provided. Additionally, some physical objects in the user's environment, even though capable of selection, may not be configured to provide any selection feedback.

In some embodiments, selection feedback is provided using a device other than the selected object. For example, selection feedback may be provided by an indicator associated with a wearable device on which the neuromuscular sensors are arranged. For example, an LED and/or a stimulator configured to provide haptic feedback located on the wearable device may be used to provide feedback upon selection of an object. In such embodiments, the feedback provided to the user may be different for different types of selected objects (e.g., different vibration patterns). Alternatively, the feedback provided to the user may be the same regardless of which object is selected. In the latter case, although such feedback may not provide an indication of which object was selected, the feedback will enable the user to understand that an object has been selected.

Some embodiments include an AR system configured to display an AR environment. In such embodiments, the AR system may be configured to provide selection feedback to the user upon selection of an object. For example, a visual indicator associated with and/or overlaid on the selected object within the displayed AR environment may be used to provide feedback indicating that the object has been selected. Alternatively, upon selection of an object, a control interface for the selected object may be displayed in the AR environment to inform the user about which object was selected. Any suitable visual indicator may be used, and aspects of the disclosure are not limited in this respect. In some embodiments, the AR system may additionally or alternatively provide feedback other than visual feedback to indicate object selection. For example, such types of feedback include, but are not limited to, auditory feedback, haptic feedback, or a combination of any two or more of visual feedback, auditory feedback, haptic feedback, or any other sensory feedback.

In some embodiments, a determination may be made as to whether the selected object has the capability to provide selection feedback to the user. When it is determined that the selected object is capable of providing selection feedback to the user, additional feedback provided by another device (e.g., a device associated with a wearable device) may not be provided. However, if it is determined that the selected object does not have the capability to provide selection feedback to the user, another device (e.g., a device associated with the wearable device) may provide feedback upon selection of the object.

In some embodiments feedback may only be provided to the user upon initiation of a control action, such that separate selection feedback is not provided. For example, the user may approach a lamp in their home and perform a clockwise rotation gesture with their hand. A control signal generated based, at least in part, on detected and/or recorded neuromuscular signals corresponding to the gesture may be used to control a brightness of the lamp (e.g., by increasing the brightness). The resulting increase in brightness may provide feedback to the user that that lamp was selected and that the control gesture was recognized properly.

After optionally providing selection feedback to the user, process 300 proceeds to act 350 where the selected object is controlled based, at least in part, on neuromuscular signals detected and/or recorded by the plurality of neuromuscular sensors. For example, one or more control signals may be generated and communicated to the selected object based, at least in part, on one or more muscular activation states identified from the detected and/or recorded neuromuscular signals and/or information derived from the neuromuscular signals. The one or more control signals may control various operations of the selected object. The one or more control signals may trigger or otherwise cause one or more actions or functions to be performed that effectuate control of one or more operations of the selected object.

The operation(s) of the selected object to be controlled may be determined based on a first muscular activation state of the user as determined from the detected and/or recorded neuromuscular signals. For example, a first muscular activation state may indicate that the user wants to control a brightness of a selected lamp in the user's environment. In some implementations, in response to the determination of the operation to be controlled, the one or more computer processors of system 100 may generate and communicate a first control signal to the selected object. The first control signal may include identification of the operation of the object to be controlled. The first control signal may include an indication to the selected object regarding the operation to be controlled.

In some embodiments that include an AR system, a control signal may also be sent to the AR system to trigger an action to be performed by the AR system. The control signal sent to the AR system may be the same signal as the first control signal or may be a different control signal. For example, the control signal sent to the AR system may instruct the AR system to display a screen associated with the selected object (e.g., a settings screen via which brightness of the selected lamp can be controlled). In another example, receipt of the control signal by the AR system may cause the AR system to communicate to the user (e.g., by displaying within an AR environment provided by the AR system) one or more instructions about how to control the operation of the selected object using muscle activation sensed by the neuromuscular activity system. For instance, the one or more instructions may indicate that a clockwise rotating gesture can be used to increase the brightness of the selected lamp and/or a counterclockwise rotating gesture can be used to decrease the brightness of the selected lamp. In some embodiments, the one or more instructions may include a visual demonstration and/or a textual description of how the gestures can be performed to control the operation of the selected object. In some embodiments, the one or more instructions may implicitly instruct the user, for example, via a spatially arranged menu that implicitly instructs that a clockwise rotating gesture can be used to increase the brightness of the selected lamp.

In some embodiments, a second muscular activation state identified from the recorded and/or detected neuromuscular signals may be used to generate a second control signal provided to the selected object to control its operation. For example, the second muscular activation state may include one or more second muscular activation states, such as, one or more clockwise rotating gestures to indicate that the user wants to increase the brightness of the selected lamp, one or more counterclockwise rotating gestures to indicate that the user wants to decrease the brightness of the selected lamp, and/or a combination of clockwise and counterclockwise gestures to adjust the brightness to a desired level. The one or more computer processors of system 100 may generate and communicate one or more second control signals to the selected object to effectuate control of the operation.

Figure 10:
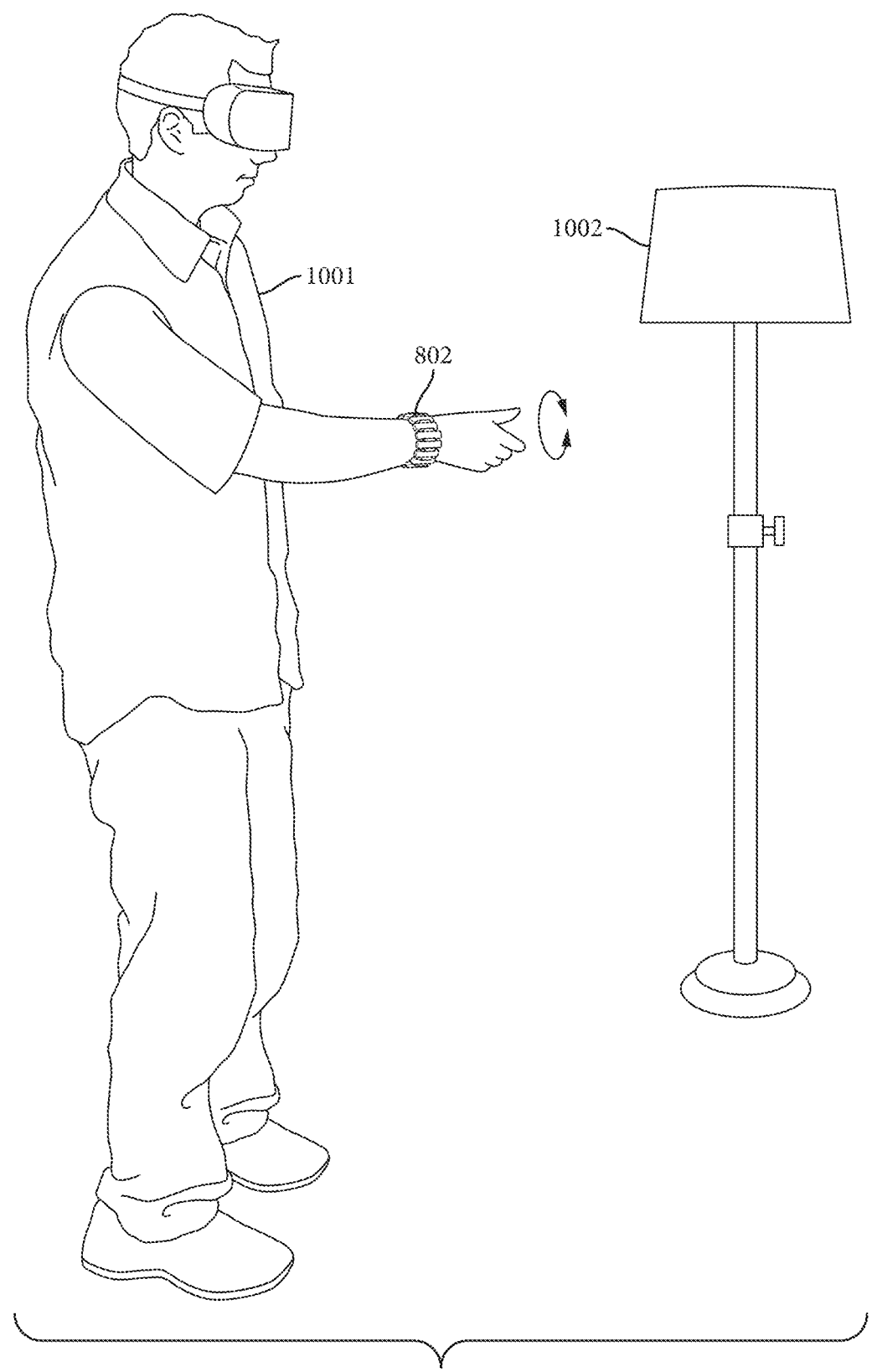
FIG. 10 illustrates a scenario in which a user may select and/or control operation of a lamp in accordance with some embodiments.

FIG. 10 illustrates a scenario in which a user 1001 wearing a virtual headset and a wearable device 802 incorporating neuromuscular sensors uses muscular activation states to control an operation of a smart lap 1002 within the user's environment. To enable control of the lamp 1002, the lamp may be selected in any suitable way, examples of which are discussed above and include, but are not limited to, selection based on proximity, selection based on one or more identified muscular activation states of the user as detected by wearable device 802, selection based on speech input, selection based on pointing, selection based on user context and/or user behavior, or any combination of the foregoing. Once selected, the user may perform one or more muscle activations to control an operation of the selected lamp 1002. For example, the user may first select the lamp 1002 for control using a voice command. Subsequently, the user may perform a dynamic gesture with their hand that simulates the user turning a dial, which is interpreted by the wearable device 802 to control an operation (e.g., the brightness) of the lamp 1002 without physically touching the lamp. Although user 1001 is shown in FIG. 10 as wearing a virtual headset, it should be appreciated that not all embodiments require the use of a virtual/augmented/extended reality headset, and the virtual headset shown in FIG. 10 is provided merely for illustration.

In some embodiments, the first muscular activation state and/or the second muscular activation state may include a static gesture (e.g., a pose) performed by the user. In some embodiments, the first muscular activation state and/or the second muscular activation state may include a dynamic gesture performed by the user. In other embodiments, the first muscular activation state and/or the second muscular activation state may include a sub-muscular activation state of the user. In yet other embodiments, the first muscular activation state and/or the second muscular activation state may include muscular tensing performed by the user. In some embodiments, detected force (e.g., muscular tensing performed by the user) may be combined with a gesture performed by the user to provide improved dynamic range. For example, the user may rotate their wrist/forearm while pinching two fingers to control the brightness of a selected lamp, where the amount of force applied between the two pinched fingers modulates whether the user desired big changes (e.g., by applying a large amount of force by pinching hard) or smaller changes (e.g., by lightly pinching the two fingers).

In the example described above, the brightness of the selected lamp is controlled based on two (e.g., first and second) muscular activation states, one for selecting an operation to be controlled and another for performing the operation. It should be appreciated, however, that such control can be achieved based on one or more than two muscular activation states without departing from the scope of this disclosure. In the case where there is only one muscular activation state, that muscular activation state may be used to determine or select the operation of the selected object to be controlled and provide the control signal to the selected object to control the operation. For example, a muscular activation state (e.g., clockwise rotating hand gesture) may be identified that indicates that the user wants to increase the brightness of the selected lamp and a control signal may be provided to the selected lamp to increase its brightness based on the single muscular activation state.

The example control signals described above relate to signals for controlling the brightness of a selected lamp. It should be appreciated however, that one or more muscular activation states may be identified based on the recorded neuromuscular signals and appropriate control signals may be generated and communicated to the selected object to control different aspects/operations of the selected object. For example, a control signal may include a signal to turn on or off the selected object, adjust a volume of the selected object, or adjust some other operating parameter of the selected object.

It will be appreciated that while the examples above describe a first and a second muscular activation state, additional or alternative muscular activation states may be identified and used to control various aspects/operations of a selected object to enable a layered or multi-level approach to controlling the selected object or to control multiple selected objects at the same time. For instance, the selected object may be operating in a first mode (e.g., a playing mode for a controllable speaker) when the user desires switch to a second mode (e.g., control mode) for controlling operations of the speaker. In this scenario, a third muscular activation state of the user (e.g., used for switching from the playing mode to the control mode) may be identified based on the raw or processed signals and/or information based on the recorded signals. The operation of the selected object (e.g., the controllable speaker) may be switched/changed from the first mode to the second mode based on the identified third muscular activation state. As another example, once in the control mode, a fourth muscular activation state may be identified based on the raw or processed signals and/or information based on the recorded signals. A particular device or function (e.g., display device, camera device, audio device, etc.) associated with the selected object may be selected for control based on the fourth muscular activation state. In this way, the third muscular activation state may be used to change the mode of the selected object (e.g., change a current mode of a selected television to a control mode), the fourth muscular activation state may be used to select a particular part of the selected object to control (e.g., a camera on the selected television). In other embodiments, one muscular activation state may be used to select a function of the selected part (e.g., selecting a zoom function on the camera), and another muscular activation state may be used to adjust the selected function (e.g., zoom in and out).

In some embodiments, prior to controlling at least one operation of the selected object, the detected and/or recorded plurality of neuromuscular signals and/or information based on the detected and/or recorded plurality of neuromuscular signals may be used to detect a user's desire to interact with the object. Detection of the user's desire to interact with the object may be performed contemporaneously with selection of an object to be controlled as described above with regard to act 330 in process 300. Alternatively, detection of the user's desire to interact with the object may be performed after the object is selected but prior to controlling the selected object. In some embodiments, a first muscular activation state (e.g., a gesture or muscular tensing) may be detected based on an analysis of the detected and/or recorded plurality of neuromuscular signals and/or information based on the plurality of neuromuscular signals, where the first muscular activation state indicates a desire to interact with an object. For example, the first muscular activation state may be a "wake-up" gesture for the object. In response to detecting the wake-up gesture for the object, an instruction may be sent to the object to enable or disable a user interface of the object or to perform some other action. The use of neuromuscular wake-up gestures to provide personalized access for controlling objects in a user's environment may improve user privacy, and may have other benefits as well including, but not limited to, increasing battery life, reducing processing power, and improving accuracy of such systems.

In some embodiments, some objects can include a user interface for controlling operation of the device or for monitoring the behavior of the user in an environment. For example microphone-based or camera-based systems may continuously observe a user's behavior to determine when and how the user wants to interact with the system. Such systems may pose significant privacy risks should the systems be recording user behavior when it is not desired. To this end, some embodiments are directed to enabling or disabling a user interface of an object or device based, at least in part, on detected and/or recorded neuromuscular signals to ensure that the object/device is only observing user behavior when the user desires such observation to take place. For example, an object having a user interface may be configured to continuously observe user behavior. Upon detection of a first muscular activation state, a control signal may be sent to the object to disable the user interface such that the user interface is no longer continuously observing user behavior. The user may them perform a second muscular activation state (which may be the same or different as the first muscular activation state) to enable the user interface. In some embodiments, the user interface may be enabled only while the user is performing a particular muscular activation state. For example, the user may approach an object having a microphone-based user interface and clench their first to indicate that the user desires to send control instructions to the object. In response to detecting the clenched first muscular activation state, the neuromuscular activity system may send a control instruction to the object to enable the microphone-based user interface for the object (e.g., by putting the user interface into a listening mode). While holding the clenched first state, the user may provide one or more voice commands to provide input to the object. The user may then release their clenched fist, which results in detection of a second muscular activation state that disables the microphone-based user interface. In this way, the microphone-based user interface for providing input to the object is only enabled when the user wants to provide input.

The systems and methods described herein for using neuromuscular signals to select and/or control physical objects based, at least in part, on gestures, poses, movements, or forces exerted across a user's joints may be employed with a wide variety of physical objects examples of which include, but are not limited to, smart earbuds/headphones, smart glasses (or other smart head mounted displays), smartphones, smartwatches, connected tablets, or other wearable or handheld personal computing devices. Whereas many connected devices are configured to use voice commands, the systems and methods described herein enable a user to react to auditory (e.g., via a 'hearable' or other connected headphone or speaker system) or visual (e.g., on a screen of a smartwatch or smartphone) with commands based on poses, gestures, or other movements and/or forces derived from neuromuscular signals. For example, a wearable wristband apparatus with a plurality of neuromuscular sensors may be configured to permit a user to respond to a smart assistant (e.g., via a wearable or handheld device with visual, haptic, and/or auditory alerts) with small, subtle gestures (e.g., via a finger tap on the user's leg to accept a meeting invitation or to confirm a hotel reservation; or a swipe gesture on a tabletop to ignore a notification; or a pinch gesture to play a video received from a friend; or a flick gesture to send a message to a colleague).

As described in some of the exemplary scenarios above, environments with multiple connected devices may require specific controls so that a user can direct their intention for control to a particular connected device. Per various embodiments, a gesture or other pattern of neuromuscular activation can be used to switch from one connected device to another for subsequent control, where the subsequent control may be based on neuromuscular control signals, voice signals, and/or any other modality of control, examples of which are described above. For example, combining voice control with control based on gestures, poses, or other patterns of movement/force exerted by the neuromuscular system can enable more reliably, diverse, discrete, and/or personalized forms of control of physical objects in a user's environment.

Table 1 below lists various (non-limiting) forms of control based on neuromuscular signals that may be achieve using various embodiments of the invention.

TABLE 1

Example forms of control of physical objects based on neuromuscular signals

| Feature | Interaction | Example Control Scheme |
|---|---|---|
| TV control - replace remote | Select app<br>Browse apps/channels<br>Play/pause<br>Go back<br>Go home<br>Menu navigation - scroll<br>Typing | Up/Down/Left/Right/Click<br>Finger taps<br>Swiping |
| Smart speaker control | Volume up/down<br>Mute/unmute<br>Previous/next<br>Play/pause | Up/Down/Left/Right/Click<br>Swiping |
| Smart lightbulb control | Lights on/off<br>Dim up/down | Up/Down/Left/Right/Click<br>Swiping |
| Back and forth | Yes/no (to virtual assistant question)<br>Confirm (purchase, reservation, etc) | Thumb up/down |
| Smart oven control | Oven on/off<br>Temp up/down<br>Preheat/bake/broil on/off | Up/Down/Left/Right/Click |
| Smart thermostat control | Thermostat On/off<br>Temp up/down | Up/Down/Left/Right/Click |
| Smart alarm system control | Camera up/down/left/right<br>Zoom in/out<br>Range increase/decrease | Up/Down/Left/Right/Click |
| Smart camera control | Camera up/down/left/right<br>Zoom in/out | Up/Down/Left/Right |
| Smart display video control | Volume up/down<br>Mute/unmute<br>Accept/decline/end call<br>Typing | Up/Down/Left/Right/Click<br>Finger taps |
| Virtual assistant activation without speaking | Virtual assistant wake<br>Virtual assistant stop | Fist + pressure |
| Phone controls mid-call | Pick up/hang up<br>Volume<br>Mute/unmute | Up/Down/Left/Right/Click |
| Video chat controls mid-call | Pick up/hang up<br>Volume<br>Mute/unmute<br>Video filters | Up/Down/Left/Right/Click<br>Poses |
| Audio controls in transit | Volume up/down<br>Forward/back 10 s<br>Play/pause<br>Mute/unmute | Up/Down/Left/Right/Click |
| Song controls on plane or subway or with company at home | Previous/next<br>Play/pause<br>Mute/unmute | Up/Down/Left/Right/Click |

TABLE 1-continued

Example forms of control of physical objects based on neuromuscular signals

| Feature | Interaction | Example Control Scheme |
|---|---|---|
| Car dashboard controls | Play/pause song<br>Mute/unmute<br>Temp on/off<br>Accept/decline call<br>Volume up/down | Up/Down/Left/Right/Click |
| Unique neuromuscular signal | User authentication | N/a |
| Unlock front door | Hover | N/a |
| Notification | Engage<br>Ignore | Swipe |
| List | Scroll through<br>Select | Wrist roll<br>Fist |
| Audiobook<br>Radio<br>News<br>Weather<br>Music<br>Phone call | Play/pause song<br>Mute/unmute<br>Temp on/off<br>Accept/decline call<br>Volume up/down | Up/down/left/right/click |
| Menu | Navigate<br>Select | Up/down/left/right/click |

Figure 11A:
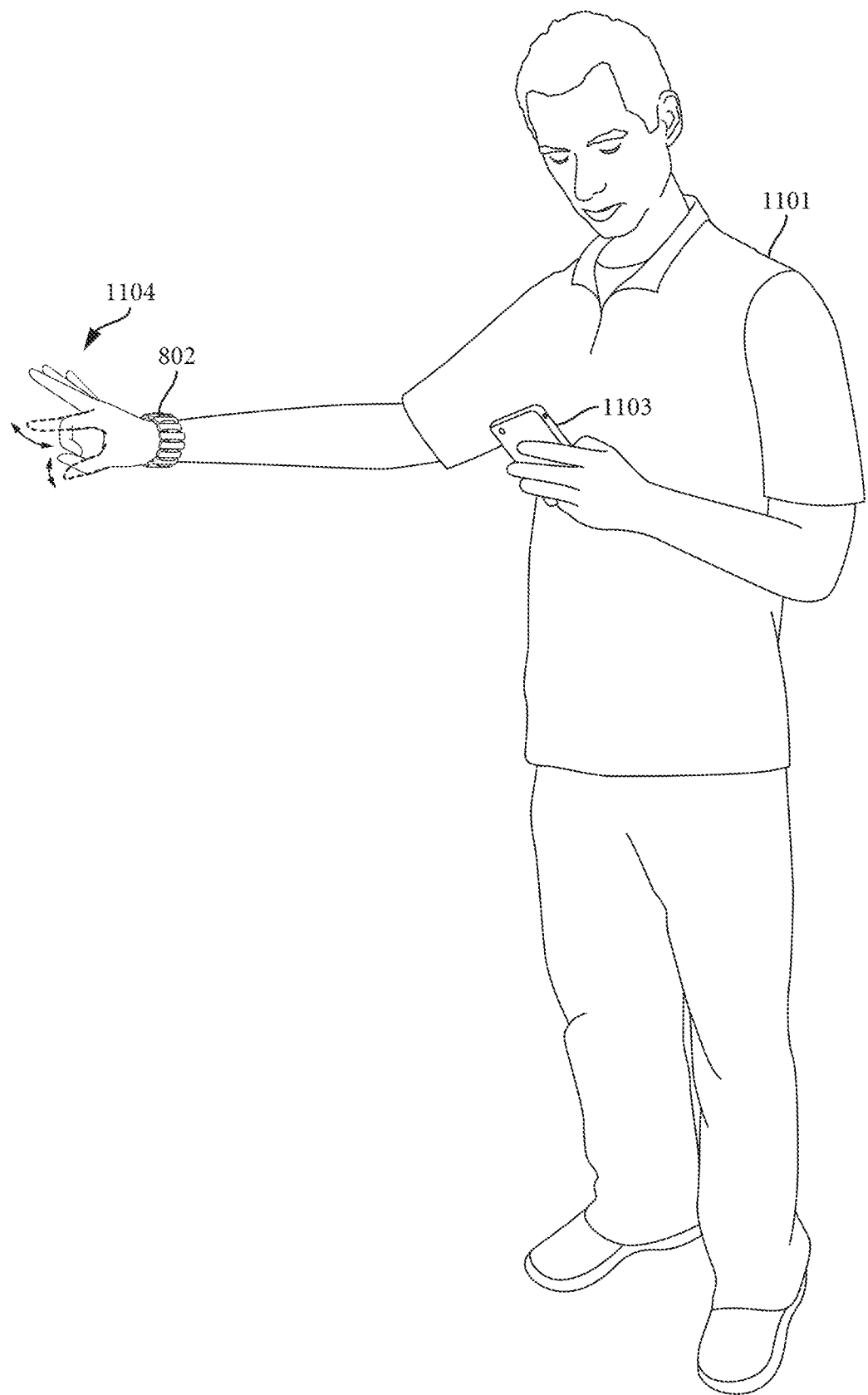
FIGS. 11A-C illustrate a mapping of different gestures or poses to control inputs for a device in accordance with some embodiments.
Figure 11B:
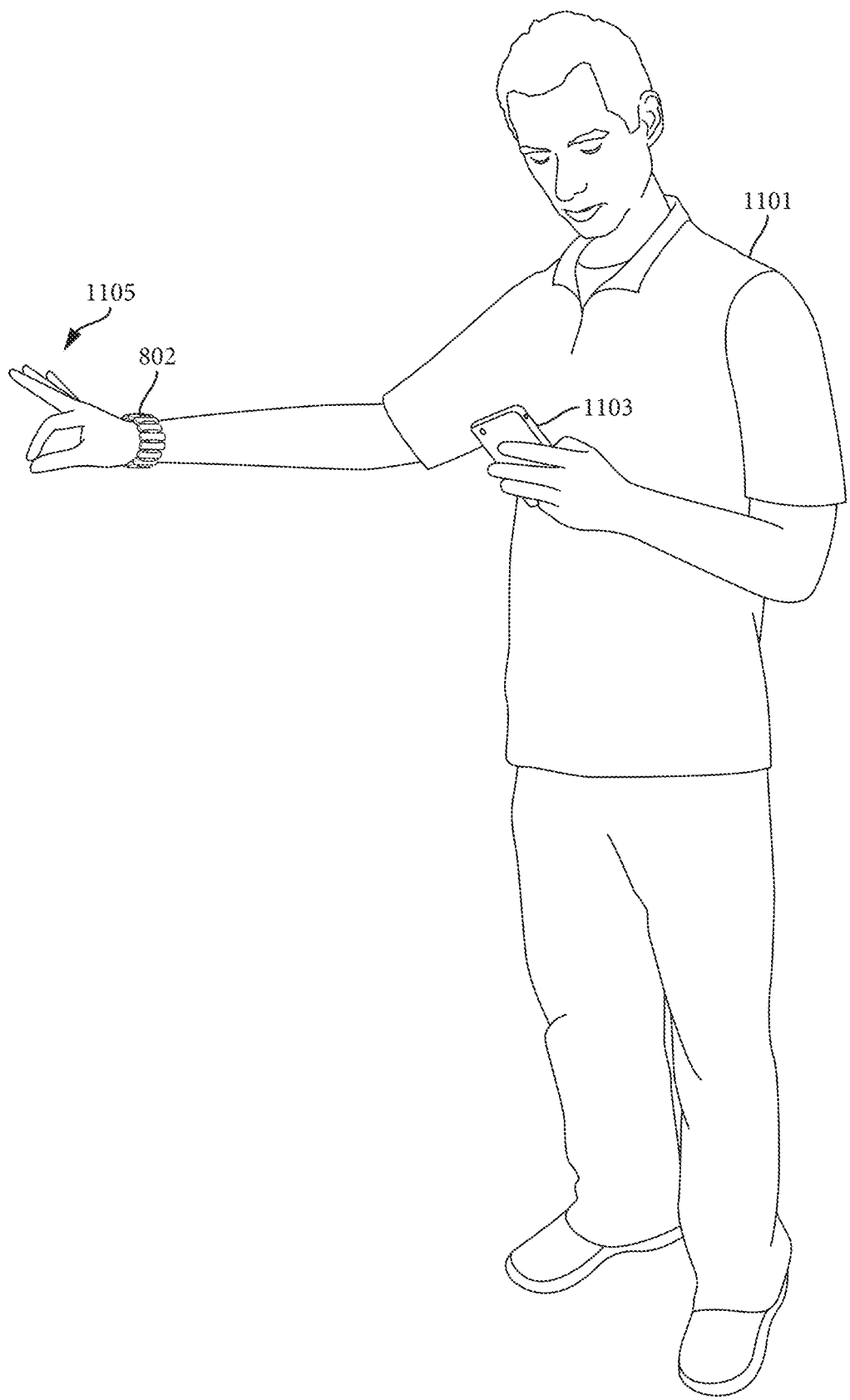
Figure 11C:
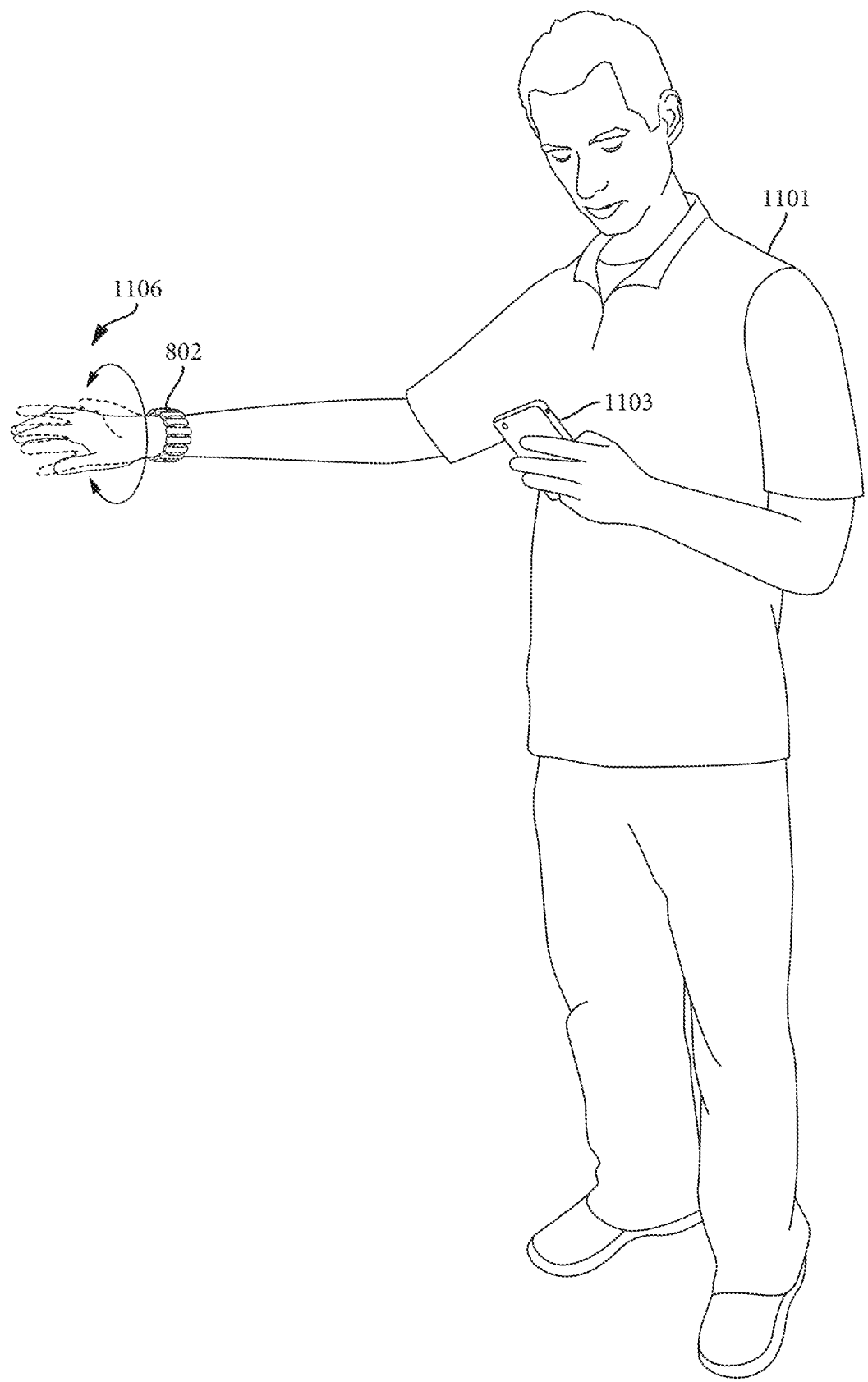

In one illustrative embodiment shown in FIGS. 11A-C, a user 1101 wearing a wearable device 802 having a plurality of neuromuscular sensors incorporated therein uses different interactive primitives to control operation of a connected device (e.g., smartphone 1103). For example, a flick gesture 1104 (FIG. 11A), or pinch taps 1105 (FIG. 11B) may be used to provide discrete input, such as selection of the smartphone 1103 or selection of a feature of the smartphone 1103 to control. As another example, a wrist roll gesture 1106 (FIG. 11C) may be used for 1D rotary control (e.g., as on a wheel selector) to provide continuous output, such as changing the brightness of the screen of the smartphone 1103.

Notifications are often an important part of smart/virtual assistant systems available through smart earbuds, head-mounted displays, mobile devices such as smartphone 1103 (or other smart connected device). In some embodiments, a flick gesture 1104 can be used as a dismissal mechanism for notifications.

In a calendar example, a smart/virtual assistant e.g., executing on a user's smartphone 1103, may notify a user that her next meeting is coming up, permitting the use of the above gestures as follows:

A flick gesture 1104 (FIG. 11A) may dismiss the notification outright. Analogous to dismissing a notification on a mobile or desktop computer. The smart/virtual assistant may not bother the user again about it.

An index pinch tap gesture 1105 (FIG. 11B—pinching the index finger and the thumb) may set a snooze alarm. The smart/virtual assistant will notify the user again in a few minutes.

A middle pinch tap gesture (pinching the middle finger and the thumb) may engage the smart/virtual assistant. Once engaged, the smart/virtual assistant may ask the user how long she should wait before notifying the user again.

The user may then start rolling her wrist 1106 (FIG. 11C) to select the time at which the smart/virtual assistant will next provide a notification. As the user's wrist is rolled (e.g., in a clockwise direction), the time until the next notification increases, and the smart/virtual assistant may optionally provide auditory feedback as the amount of time changes. If the time until the next notification is too far in the future, the user can roll their wrist back in the other direction (e.g., in a counter-clockwise direction), which may cause the time until the next notification to decrease.

When the desired time is set, another pinch tap 1105 (e.g., FIG. 11B) may set the alarm and the smart/virtual assistant may notify the user again after that amount of time has passed. At any point in this process a flick gesture 1104 (FIG. 11A) may be used to cause the time setting process to end.

Although the above-described example for using a neuromuscular activity system to respond to and/or set notifications on a physical device describes interpreting gestures and/or poses that the user is performing, it should be appreciated that selection and/or control of physical objects using one or more of the techniques described herein may be performed using any muscle activation state including, but not limited to, sub-muscular activation, in which perceptible movements of the user are not required. Using sub-muscular control may be particularly useful in scenarios in which the user desires to control a physical object without changing the position of their hands, examples of which include, but are not limited to, interacting with a music app while keeping both hands on the steering component of a vehicle (e.g., handlebars of a bicycle or scooter, steering wheel of an automobile, etc.), controlling an electronic device without having to take off gloves or without having to take hands out of pockets (e.g., in cold weather), interacting with selectable objects (e.g., a GPS system) in an automobile while driving and keeping both hands on the steering wheel, and unlocking a door with a smart lock when the user's hands are not available (e.g., the user is carrying objects or holding onto a child) to use a key to unlock the door.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A computerized system for controlling a physical object in an environment based, at least in part, on neuromuscular signals, the system comprising:
a plurality of neuromuscular sensors configured to record a plurality of neuromuscular signals from a user, wherein the plurality of neuromuscular sensors are arranged on one or more wearable devices; and
at least one computer processor programmed to:
select a physical object within an environment of the user;
provide feedback to the user indicating that the physical object has been selected;
determine a first muscular activation state, based, at least in part, on the plurality of neuromuscular signals and/or information based on the plurality of neuromuscular signals; and
control an operation of the selected physical object based, at least in part, on the determined first muscular activation state, wherein
selection of the physical object uses an inference model to predict the selection of the physical object based on the plurality of neuromuscular signals, and
the inference model is trained to associate the plurality of neuromuscular signals with one or more selectable physical objects in the environment.

2. The computerized system of claim 1, further comprising:
at least one storage device configured to store information describing an association between one or more selectable physical objects in the environment and a plurality of muscular activation states,
wherein selecting the physical object within the environment is based, at least in part, on the stored information.

3. The computerized system of claim 1, wherein
the plurality of neuromuscular signals used, at least in part, to determine the first muscular activation state are recorded during a first time period,
the at least one computer processor is further programmed to determine a second muscular activation state based, at least in part, on a plurality of neuromuscular signals and/or information based on the plurality of neuromuscular signals recorded during a second time period, and
selecting the physical object within the environment of the user is based, at least in part, on the determined second muscular activation state.

4. The computerized system of claim 1, wherein selecting the physical object is based, at least in part, on user context and/or user behavior.

5. The computerized system of claim 1, wherein
the at least one computer processor is further programmed to receive speech input from the user, and
selecting the physical object is based, at least in part, on the received speech input.

6. The computerized system of claim 1, wherein selecting the physical object is based, at least in part, on a proximity of the user to the physical object.

7. The computerized system of claim 6, wherein selecting the physical object is based, at least in part, on a proximity of the user to the physical object relative to other selectable physical objects in the environment of the user.

8. The computerized system of claim 1, wherein providing feedback to the user indicating that the physical object has been selected comprises instructing the selected physical object to provide the feedback.

9. The computerized system of claim 1, wherein providing feedback to the user indicating that the physical object has been selected comprises providing one or more of auditory feedback and vibratory feedback.

10. The computerized system of claim 1, further comprising:
at least one storage device configured to store information describing an association between at least one control action for each of one or more selectable physical objects in the environment and a corresponding muscular activation state including the first muscular activation state,
wherein controlling an operation of the selected physical object is based, at least in part, on the stored information describing an association between the at least one control action for the selected physical object and the first muscular activation state.

11. The computerized system of claim 1, wherein the at least one computer processor is further programmed to:
detect, based at least in part on the plurality of neuromuscular signals and/or information based on the plurality of neuromuscular signals, a second muscular activation state indicating a desire to control an operation of the selected physical object.

12. The computerized system of claim 11, wherein the at least one computer processor is further programmed to:
send an instruction to the selected physical object to enable or disable a user interface of the selected physical object in response to detecting the second muscular activation state, wherein sending an instruction to the selected physical object comprises sending an instruction to enable the user interface; and
control an operation of the selected physical object based, at least in part, on the first muscular activation state after the user interface has been enabled.

13. A method performed by a computerized system for controlling a physical object in an environment based, at least in part, on neuromuscular signals, the method comprising:
recording a plurality of neuromuscular signals from a plurality of neuromuscular sensors arranged on one or more wearable devices;
selecting a physical object within an environment of the user;
providing feedback to the user indicating that the physical object has been selected;
determining a first muscular activation state, based, at least in part, on the plurality of neuromuscular signals and/or information based on the plurality of neuromuscular signals; and
controlling an operation of the selected physical object based, at least in part, on the determined first muscular activation state, wherein
selecting the physical object uses an inference model to predict selection of the physical object based on the plurality of neuromuscular signals, and
the inference model is trained to associate the plurality of neuromuscular signals with one or more selectable physical objects in the environment.

14. The method of claim 13, further comprising:
storing, on at least one storage device, information describing an association between one or more selectable physical objects in the environment and a plurality of muscular activation states,
wherein selecting the physical object within the environment is based, at least in part, on the stored information.

15. The method of claim 13, wherein selecting the physical is further based, at least in part, on user context and/or user behavior.

16. The method of claim 13, further comprising:
receiving speech input from the user,
wherein selecting the physical object is based, at least in part, on the received speech input.

17. The method of claim 13, wherein selecting the physical object is based, at least in part, on a proximity of the user to the physical object.

18. The method of claim 13, wherein providing feedback to the user indicating that the physical object has been selected comprises instructing the selected physical object to provide the feedback.

19. The method of claim 13, further comprising:
storing, by at least one storage device, information describing an association between at least one control action for each of one or more selectable physical objects in the environment and a corresponding muscular activation state including the first muscular activation state,
wherein controlling an operation of the selected physical object is based, at least in part, on the stored information describing an association between the at least one control action for the selected physical object and the first muscular activation state.

20. The method of claim 13, further comprising:
detecting, based at least in part on the plurality of neuromuscular signals and/or information based on the plurality of neuromuscular signals, a second muscular activation state indicating a desire to control an operation of the selected physical object; and
sending an instruction to the selected physical object to enable or disable a user interface of the selected physical object in response to detecting the second muscular activation state.

21. The method of claim 20, wherein sending an instruction to the selected physical object comprises sending an instruction to enable the user interface, and wherein the method further comprises:
controlling an operation of the selected physical object based, at least in part, on the first muscular activation state after the user interface has been enabled.

22. The method of claim 20, wherein
the plurality of neuromuscular signals used, at least in part, to determine the first muscular activation state are recorded during a first time period,
the method further comprises determining a second muscular activation state based, at least in part, on a plurality of neuromuscular signals and/or information based on the plurality of neuromuscular signals recorded during a second time period, and
selecting the physical object within the environment of the user is based, at least in part, on the determined second muscular activation state.

23. At least one non-transitory computer-readable storage medium storing instructions that, when executed by at least one computer processor, causes the at least one computer processor to perform a method, the method comprising:
recording a plurality of neuromuscular signals from a plurality of neuromuscular sensors arranged on one or more wearable devices;
selecting a physical object within the environment;
providing feedback to the user indicating that the physical object has been selected;
determining a first muscular activation state, based, at least in part, on the plurality of neuromuscular signals and/or information based on the plurality of neuromuscular signals; and
controlling an operation of the selected physical object based, at least in part, on the determined first muscular activation state, wherein selecting the physical object uses an inference model to predict selection of the physical object based on the plurality of neuromuscular signals without a perceptible movement of the user, and the inference model is trained to associate the plurality of neuromuscular signals with one or more selectable physical objects in the environment.

24. The at least one non-transitory computer-readable storage medium of claim 23, wherein the method further comprises:

storing, on at least one storage device, information describing an association between one or more selectable physical objects in the environment and a plurality of muscular activation states, wherein selecting the physical object within the environment is based, at least in part, on the stored information.

25. The at least one non-transitory computer-readable storage medium of claim 23, wherein selecting the physical object is further based, at least in part, on user context and/or user behavior.

26. The at least one non-transitory computer-readable storage medium of claim 23, wherein the method further comprises receiving speech input from the user, and selecting the physical object is based, at least in part, on the received speech input.

27. The at least one non-transitory computer-readable storage medium of claim 23, wherein providing feedback to the user indicating that the physical object has been selected comprises instructing the selected physical object to provide the feedback.

28. The at least one non-transitory computer-readable storage medium of claim 23, wherein the method further comprises:

storing, by at least one storage device, information describing an association between at least one control action for each of one or more selectable physical objects in the environment and a corresponding muscular activation state including the first muscular activation state, wherein controlling an operation of the selected physical object is based, at least in part, on the stored information describing an association between the at least one control action for the selected physical object and the first muscular activation state.

29. The at least one non-transitory computer-readable storage medium of claim 23, wherein the method further comprises:

detecting, based at least in part on the plurality of neuromuscular signals and/or information based on the plurality of neuromuscular signals, a second muscular activation state indicating a desire to control an operation of the selected physical object;

sending an instruction to the selected physical object to enable a user interface of the selected physical object in response to detecting the second muscular activation state; and controlling an operation of the selected physical object based, at least in part, on the first muscular activation state after the user interface has been enabled.

30. The at least one non-transitory computer-readable storage medium of claim 23, wherein the plurality of neuromuscular signals used, at least in part, to determine the first muscular activation state are recorded during a first time period, the method further comprises determining a second muscular activation state based, at least in part, on a plurality of neuromuscular signals and/or information based on the plurality of neuromuscular signals recorded during a second time period, and selecting the physical object within the environment of the user is based, at least in part, on the determined second muscular activation state.

* * * * *